US011662360B2

(12) United States Patent
Tanaka

(10) Patent No.: US 11,662,360 B2
(45) Date of Patent: \*May 30, 2023

(54) PHYSICAL QUANTITY SENSOR HAVING A MOVABLE BODY FORMED WITH THROUGH-HOLES TO REDUCE A DIFFERENCE BETWEEN THE INSIDE-HOLE DAMPING AND THE SQUEEZE FILM DAMPING

(71) Applicant: Seiko Epson Corporation, Tokyo (JP)

(72) Inventor: Satoru Tanaka, Chino (JP)

(73) Assignee: SEIKO EPSON CORPORATION

( * ) Notice: Subject to any disclaimer, the term of this patent is extended or adjusted under 35 U.S.C. 154(b) by 319 days.

This patent is subject to a terminal disclaimer.

(21) Appl. No.: 17/021,195

(22) Filed: Sep. 15, 2020

(65) Prior Publication Data

US 2021/0003607 A1 Jan. 7, 2021

Related U.S. Application Data

(63) Continuation of application No. 16/371,168, filed on Apr. 1, 2019, now Pat. No. 10,809,278.

(30) Foreign Application Priority Data

Apr. 2, 2018 (JP) .............................. JP2018-071189

(51) Int. Cl.
*G01C 19/5755* (2012.01)
*G01P 15/08* (2006.01)
*G01P 15/125* (2006.01)

(52) U.S. Cl.
CPC ...... *G01P 15/0802* (2013.01); *G01C 19/5755* (2013.01); *G01P 15/125* (2013.01)

(58) Field of Classification Search
CPC ..................... G01P 15/0802; G01C 19/5755
USPC ..................................................... 73/514.32
See application file for complete search history.

(56) References Cited

U.S. PATENT DOCUMENTS

| 6,923,062 | B2 | 8/2005 | Franz et al. |
| 8,746,066 | B2 | 6/2014 | Classen et al. |
| 10,809,278 | B2 * | 10/2020 | Tanaka .................. G01P 15/125 |
| 2003/0115960 | A1 | 6/2003 | Franz et al. |
| 2019/0162754 | A1 * | 5/2019 | Tanaka .................. B81B 3/0021 |

FOREIGN PATENT DOCUMENTS

| JP | 2003-519384 A | 6/2003 |
| WO | 01-50137 A2 | 7/2001 |

\* cited by examiner

*Primary Examiner* — John Fitzgerald
*Assistant Examiner* — Rodney T Frank
(74) *Attorney, Agent, or Firm* — Harness, Dickey & Pierce, P.L.C.

(57) ABSTRACT

A physical quantity sensor includes a substrate, a movable body that faces the substrate, a fixed portion that is fixed to the substrate, and a support beam that couples the movable body to the fixed portion. The movable body is displaceable with the support beam as a rotation axis, and includes, in a plan view, a first mass that is located on one side of a second direction with respect to the rotation axis, and a second mass that is located on the other side. Each of the first mass and the second mass has a plurality of through-holes which penetrate through the movable body and each of which has a square shape as an opening shape. When damping is indicated by C, and a minimum value of the damping is indicated by Cmin, C≤1.5≤Cmin.

17 Claims, 23 Drawing Sheets

PHYSICAL QUANTITY SENSOR HAVING A MOVABLE BODY FORMED WITH THROUGH-HOLES TO REDUCE A DIFFERENCE BETWEEN THE INSIDE-HOLE DAMPING AND THE SQUEEZE FILM DAMPING

CROSS-REFERENCE TO RELATED APPLICATIONS

This application is a continuation of U.S. patent application Ser. No. 16/371,168, filed Apr. 1, 2019, which claims priority from Japanese Patent Application No. 2018-071189, filed Apr. 2, 2018, the disclosures of which are hereby expressly incorporated by reference herein in their entireties.

BACKGROUND

1. Technical Field

The present disclosure relates to a physical quantity sensor, a physical quantity sensor device, a composite sensor device, an inertial measurement unit, a vehicle positioning apparatus, a portable electronic apparatus, an electronic apparatus, and a vehicle.

2. Related Art

For example, an acceleration sensor disclosed in JP-T-2003-519384 includes a substrate, a fixed portion fixed to the substrate, a movable body coupled to the fixed portion via a beam, and a fixed detection electrode which is disposed on the substrate and detects an electrostatic capacitance generated between the fixed detection electrode and the movable body. In a case where acceleration is applied in a direction in which the movable body overlaps the fixed detection electrode, the movable body swings with the beam as a rotation axis, and thus a gap between the movable body and the fixed detection electrode changes such that the electrostatic capacitance changes. Thus, the acceleration sensor disclosed JP-T-2003-519384 can measure acceleration based on the change in the electrostatic capacitance.

However, in the acceleration sensor disclosed in JP-T-2003-519384, there is a problem in that an electrostatic capacitance generated between the movable body and the fixed detection electrode is reduced due to a through-hole formed in the movable body, and thus acceleration measurement sensitivity is reduced due to air resistance occurring during swinging of the movable body.

SUMMARY

A physical quantity sensor according to an aspect of the present disclosure includes a substrate; a movable body that faces the substrate; a fixed portion fixed to the substrate; and a support beam that couples the movable body to the fixed portion, in which the movable body is displaceable with the support beam as a rotation axis, and includes, in a plan view, a first mass located on one side of a second direction orthogonal to a first direction which is a direction along the rotation axis with respect to the rotation axis, a second mass located on the other side of the second direction with respect to the rotation axis, and a connection portion that connects the first mass to the second mass, each of the first mass and the second mass has a plurality of through-holes which penetrate through the movable body in a third direction orthogonal to the first direction and the second direction and each of which has a square shape as an opening shape, $$C = 2aL \frac{8\mu H}{\beta^2 r_0^2} \left(1 + \frac{3r_0^4 K(\beta)}{16 H h^3}\right) \left[1 - \frac{l}{a}\tanh\left(\frac{a}{l}\right)\right] \quad (1)$$

in which a length of the through-hole in the third direction is indicated by H, a length of ½ of a length of the movable body along the first direction is indicated by a, a length of the movable body along the second direction is indicated by L, a gap between a fixed electrode on the substrate and the movable body is indicated by h, a length of one side of the through-hole is indicated by S0, a gap between the adjacent through-holes is indicated by S1, a viscous resistance is indicated by $\mu$, and damping occurring in the movable body is indicated by C, here, $$l = \sqrt{\frac{2h^3 H_{eff} \eta(\beta)}{3\beta^2 r_0^2}}$$

$$H_{eff} = H + \frac{3\pi r_0}{8}$$

$$\eta(\beta) = 1 + \frac{3r_0^4 K(\beta)}{16 H h^3}$$

$$K(\beta) = 4\beta^2 - \beta^4 - 4\ln\beta - 3$$

$$\beta = \frac{r_0}{r_c}$$

$$r_c = \frac{S0 + S1}{\sqrt{\pi}}$$

$$r_0 = 0.547 \times S0,$$

and
in the above Equation (1), C≤1.5×Cmin in a case in which C when the following equation is established is indicated by Cmin, $$\frac{3r_0^4 K(\beta)}{16 H h^3} = 1.$$

DESCRIPTION OF EXEMPLARY EMBODIMENTS

Hereinafter, a physical quantity sensor, a physical quantity sensor device, a composite sensor device, an inertial measurement unit, a vehicle positioning apparatus, a portable electronic apparatus, an electronic apparatus, and a vehicle will be described in detail based on embodiments illustrated in the accompanying drawings.

First Embodiment

First, a physical quantity sensor according to a first embodiment of the present disclosure will be described.

Figure 1:
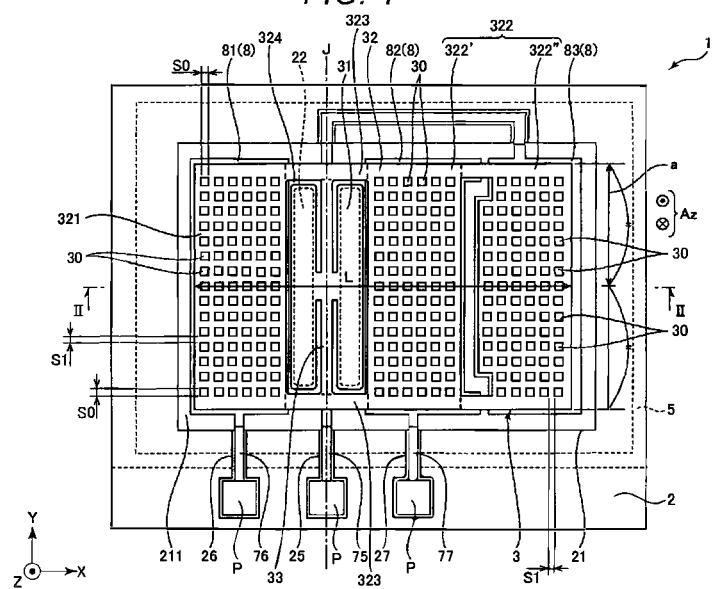
FIG. 1 is a plan view illustrating a physical quantity sensor according to a first embodiment of the present disclosure.
Figure 2:
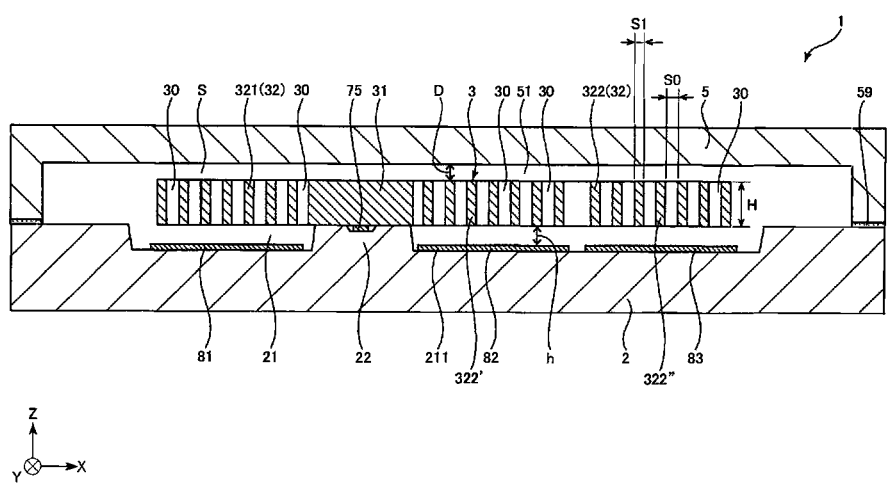
FIG. 2 is a sectional view taken along the line II-II in FIG. 1.
Figure 3:
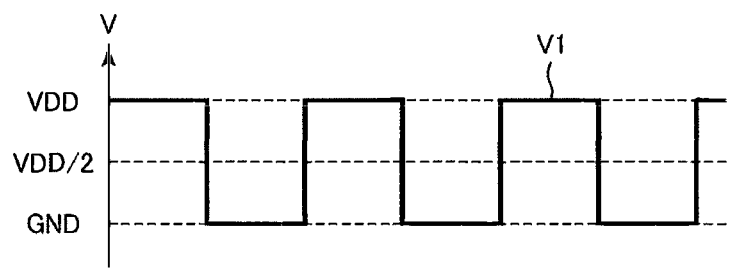
FIG. 3 is a diagram illustrating voltages applied to the physical quantity sensor illustrated in FIG. 1.
Figure 4:
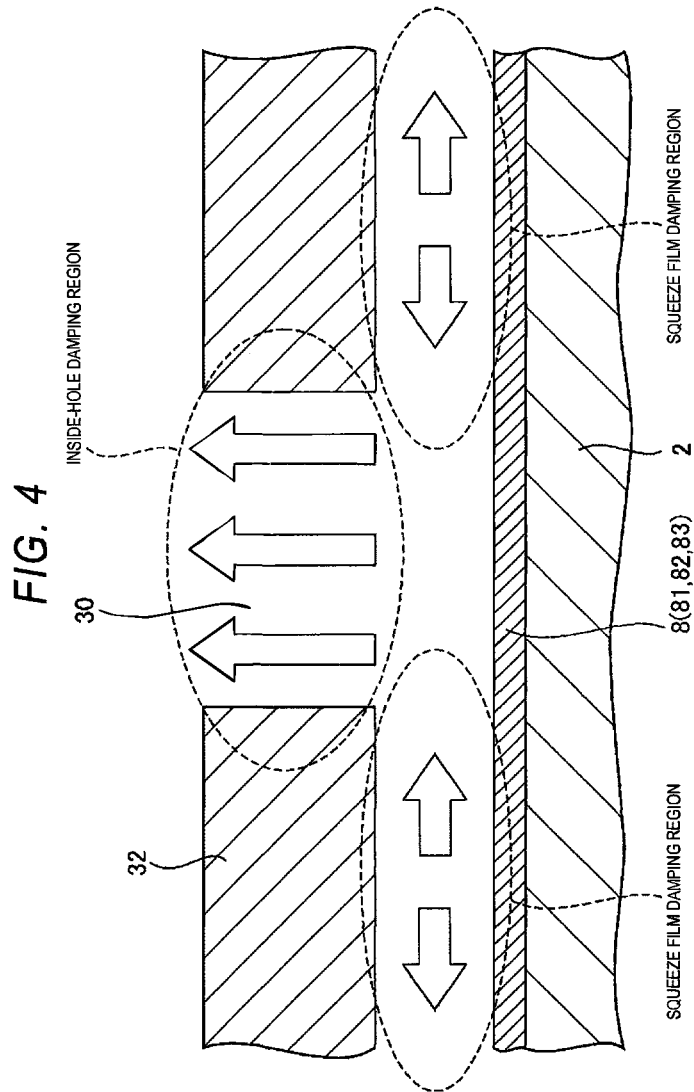
FIG. 4 is a schematic diagram for explaining damping.
Figure 5:
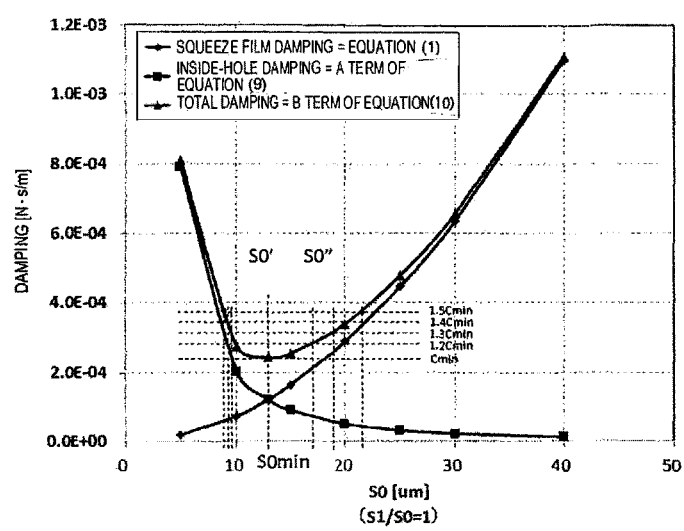
FIG. 5 is a graph illustrating a relationship between S0 and damping.
Figure 6:
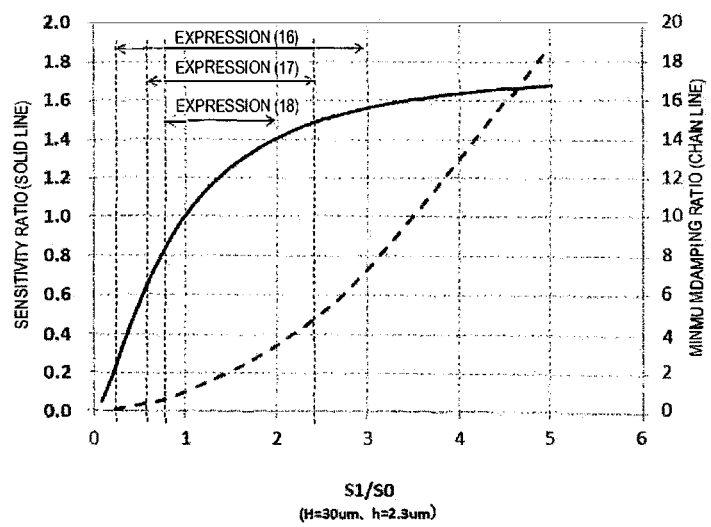
FIG. 6 is a graph illustrating a relationship among S1/S0, and a sensitivity ratio and a damping ratio.
Figure 7:
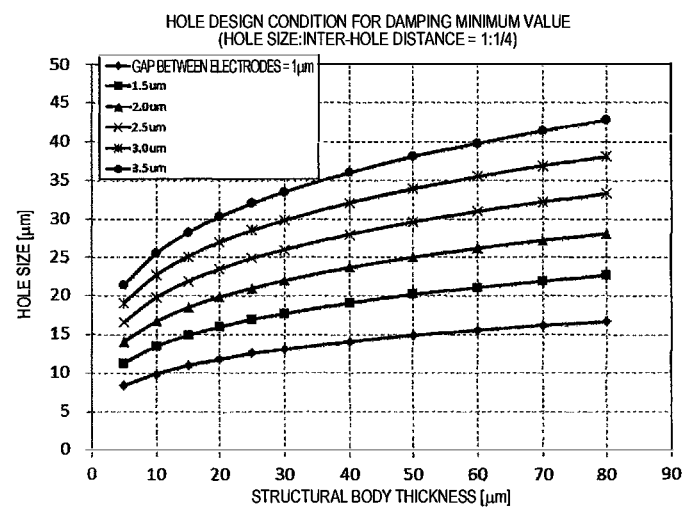
FIG. 7 is a graph illustrating a relationship between a structural body thickness and a hole size.
Figure 8:
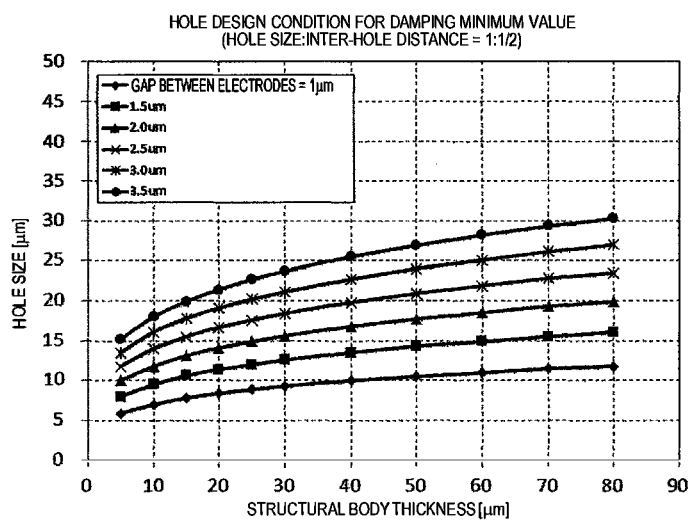
FIG. 8 is a graph illustrating a relationship between a structural body thickness and a hole size.
Figure 9:
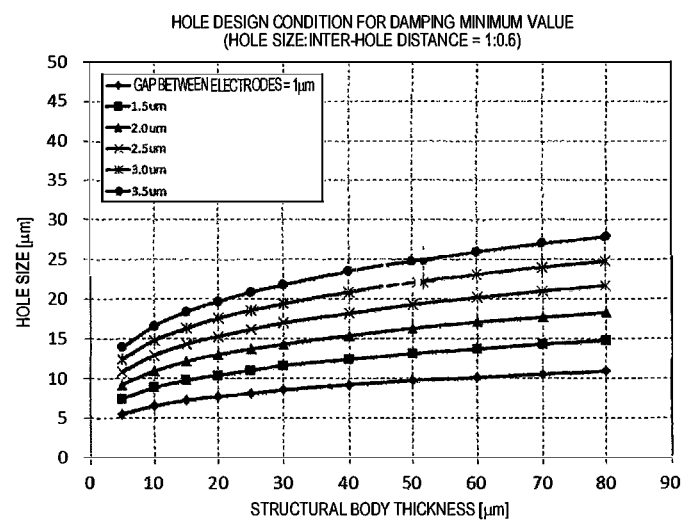
FIG. 9 is a graph illustrating a relationship between a structural body thickness and a hole size.
Figure 10:
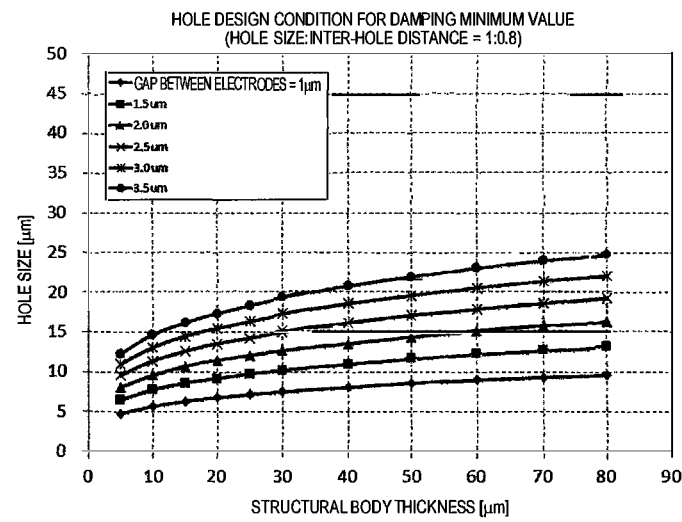
FIG. 10 is a graph illustrating a relationship between a structural body thickness and a hole size.
Figure 11:
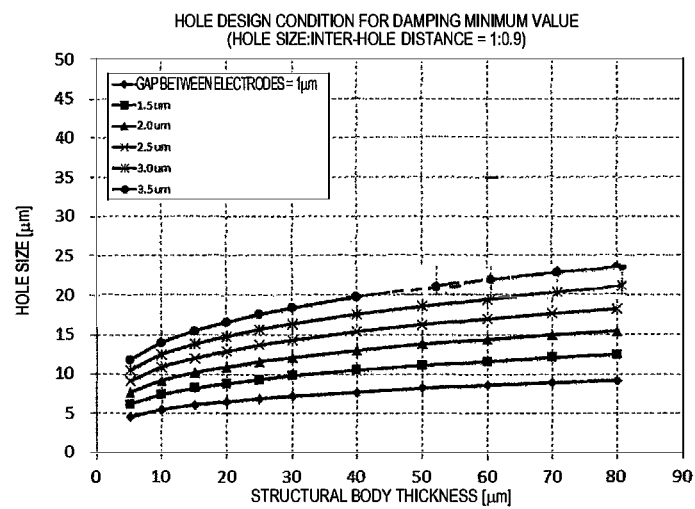
FIG. 11 is a graph illustrating a relationship between a structural body thickness and a hole size.
Figure 12:
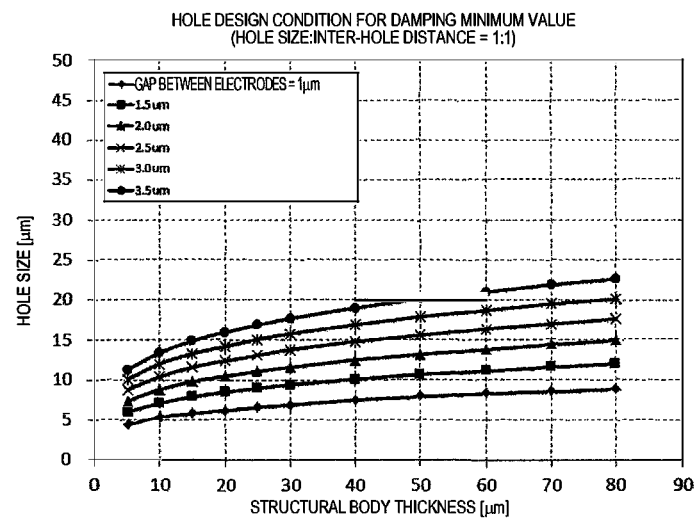
FIG. 12 is a graph illustrating a relationship between a structural body thickness and a hole size.
Figure 13:
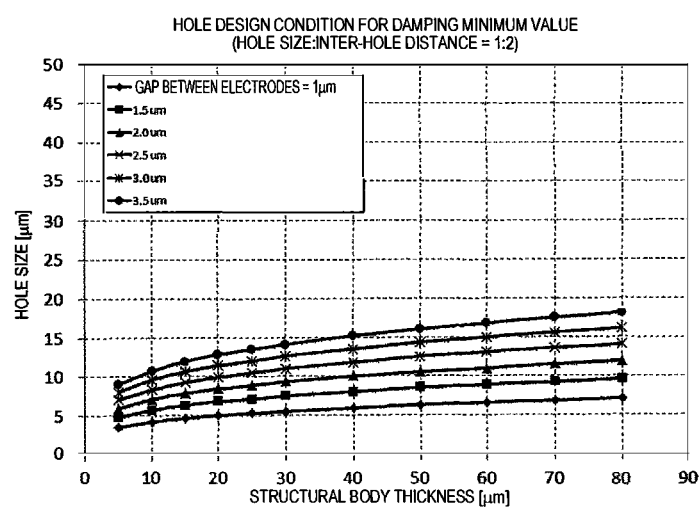
FIG. 13 is a graph illustrating a relationship between a structural body thickness and a hole size.
Figure 14:
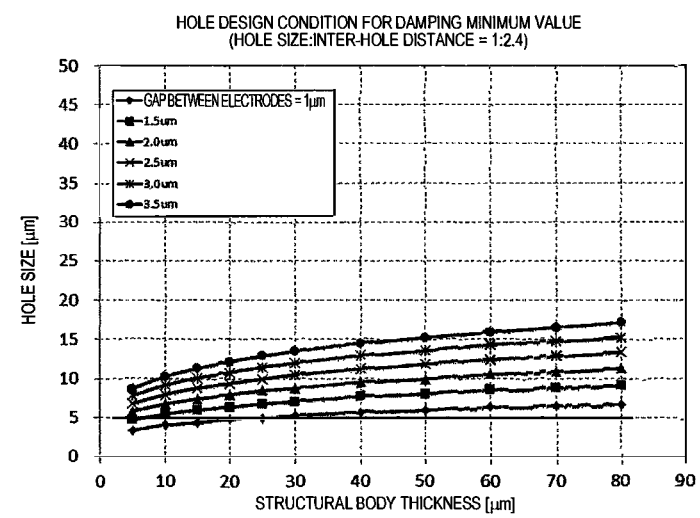
FIG. 14 is a graph illustrating a relationship between a structural body thickness and a hole size.
Figure 15:
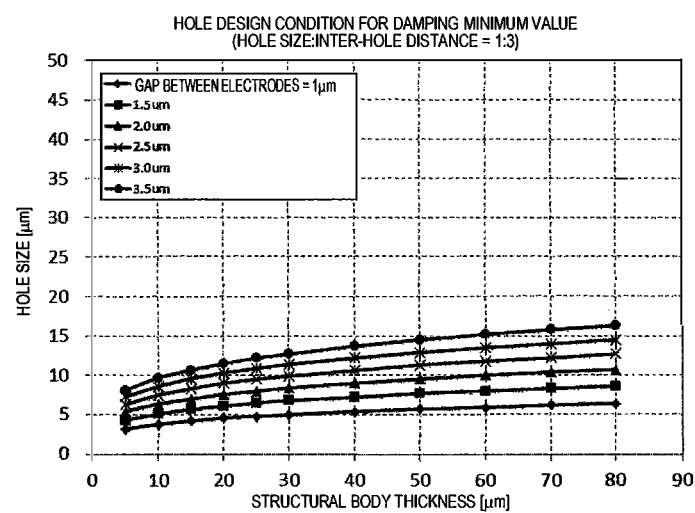
FIG. 15 is a graph illustrating a relationship between a structural body thickness and a hole size.
Figure 16:
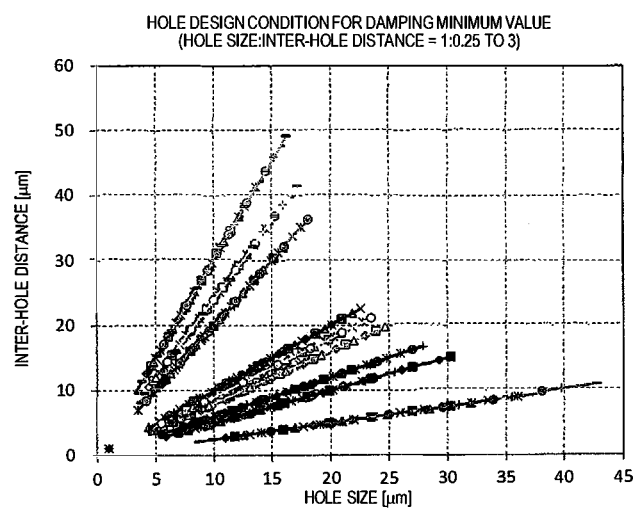
FIG. 16 is a graph illustrating relationships among S0min and S1min, and H and h.
Figure 17:
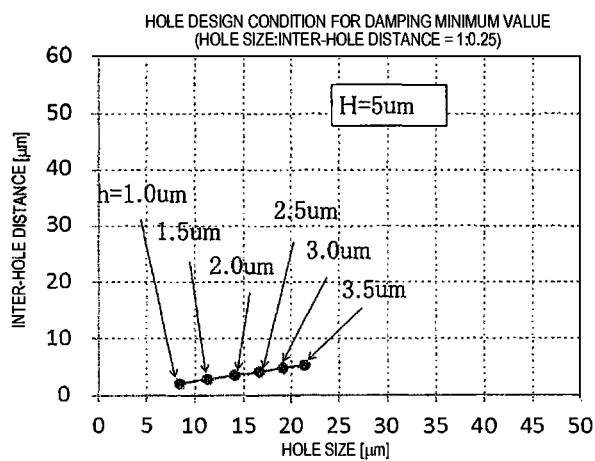
FIG. 17 is a graph illustrating relationships among S0min and S1min, and H and h.
Figure 18:
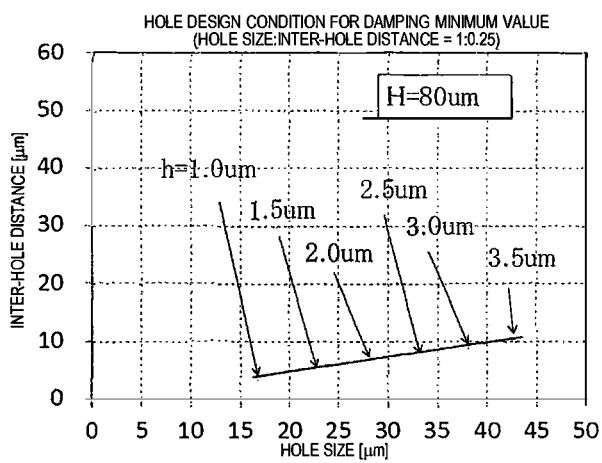
FIG. 18 is a graph illustrating relationships among S0min and S1min, and H and h.

FIG. 1 is a plan view illustrating a physical quantity sensor according to a first embodiment of the present disclosure. FIG. 2 is a sectional view taken along the line II-II in FIG. 1. FIG. 3 is a diagram illustrating voltages applied to the physical quantity sensor illustrated in FIG. 1. FIG. 4 is a schematic diagram for explaining damping. FIG. 5 is a graph illustrating a relationship between S0 and damping. FIG. 6 is a graph illustrating a relationship among S1/S0, and a sensitivity ratio and a damping ratio. Each of FIGS. 7 to 15 is a graph illustrating a relationship between a structural body thickness and a hole size. Each of FIGS. 16 to 18 is a graph illustrating relationships among S0min and S1min, and H and h. Each of FIGS. 18 to 22 is a graph illustrating relationships among S0min and S1min, and H and h.

Hereinafter, for convenience of description, three axes orthogonal to each other will be referred to as an X axis, a Y axis, and a Z axis, a direction parallel to the X axis will be referred to as an "X axis direction (second direction)", a direction parallel to the Y axis will be referred to as a "Y axis direction (first direction)", and a direction parallel to the Z axis will be referred to as a "Z axis direction (third direction)". A tip side of each axis in an arrow direction will be referred to as a "positive side", and an opposite side thereto will be referred to as a "negative side". A Z axis direction positive side will be referred to as an "upper side", and a Z axis direction negative side will be referred to as a "lower side".

In the present specification, the term "orthogonal" includes not only a case where two elements intersect each other at 90° but also a case where two elements intersect each other at an angle (for example, 90°±10° (80° to 100°) which is slightly inclined from 90°. Specifically, a case where the X axis is inclined by about ±10° (−10° to +10°) with respect to a normal direction to a YZ plane, a case where the Y axis is inclined by about ±10° (−10° to +10°) with respect to a normal direction to an XZ plane, and a case where the Z axis is inclined by about ±10° (−10° to +10°) with respect to a normal direction to an XY plane are also included in the term "orthogonal".

A physical quantity sensor 1 illustrated in FIG. 1 is an acceleration sensor which can measure an acceleration Az in the Z axis direction. The physical quantity sensor 1 includes a substrate 2, an element assembly 3 disposed on the substrate 2, and a lid 5 which is bonded to the substrate 2 so as to cover the element assembly 3. Hereinafter, each portion will be described in detail in order.

Substrate

As illustrated in FIG. 1, the substrate 2 has a depression 21 which is open to an upper surface side thereof. The depression 21 is formed to be larger than the element assembly 3 so as to include the element assembly 3 inside thereof in a plan view from the Z axis direction. The depression 21 functions as a relief portion for preventing the element assembly 3 from being brought into contact with the substrate 2. As illustrated in FIG. 2, the substrate 2 includes a mount portion 22 having a protrusion shape provided on a bottom surface 211 of the depression 21. The element assembly 3 is bonded to an upper surface of the mount portion 22. Consequently, the element assembly 3 can be fixed to the substrate 2 in a state of being separated from the bottom surface 211 of the depression 21. As illustrated in FIG. 1, the substrate 2 has grooves 25, 26, and 27 which are open to the upper surface side thereof.

As the substrate 2, a glass substrate made of a glass material (for example, borosilicate glass such as Pyrex glass (registered trademark) or Tempax glass (registered trademark)) containing alkali metal ions (for example, movable ions such as $Na^+$) may be used. However, the substrate 2 is not particularly limited, and, for example, a silicon substrate or a ceramic substrate may be used.

As illustrated in FIG. 1, the substrate 2 is provided with electrodes 8. The electrodes 8 include a first fixed electrode 81, a second fixed electrode 82, and a dummy electrode 83 which are disposed on the bottom surface 211 of the depression 21. The substrate 2 is provided with wirings 75, 76, and 77 disposed in the grooves 25, 26, and 27. One end part of each of the wirings 75, 76, and 77 is exposed to the outside of the lid 5, and functions as an electrode pad P for electrical coupling with an external device. As illustrated in FIG. 2, the wiring 75 is led to the mount portion 22, and is electrically coupled to the element assembly 3 on the mount portion 22. The wiring 75 is also electrically coupled to the dummy electrode 83. The wiring 76 is electrically coupled to the first fixed electrode 81, and the wiring 77 is electrically coupled to the second fixed electrode 82.

Lid

As illustrated in FIG. 2, the lid 5 has a depression 51 which is open to a lower surface side thereof. The lid 5 stores the element assembly 3 in the depression 51, and is bonded to the upper surface of the substrate 2. A storage space S storing the element assembly 3 is formed by the lid 5 and the substrate 2.

The storage space S is an air-tight space. The storage space S is enclosed with an inert gas such as nitrogen, helium, or argon, and is preferably substantially in the atmospheric pressure at a usage temperature (−40° C. to 120° C.). However, an atmosphere of the storage space S is not particularly limited, and may be, for example, in a depressed state, and may be in a pressed state.

The lid 5 may employ a silicon substrate. However, the lid 5 is not particularly limited, and, for example, a glass substrate or a ceramic substrate may be used. A method of bonding the substrate 2 and the lid 5 to each other is not particularly limited, and may employ a method which is selected as appropriate depending on a material of the substrate 2 or the lid 5, and may employ, for example, anodic bonding, activation bonding in which bonding surfaces activated through plasma irradiation are bonded together, bonding using a bonding material such as glass frits, or diffusion bonding in which metal films formed on the upper surface of the substrate 2 and the lower surface of the lid 5 are bonded to each other. In the present embodiment, the substrate 2 and the lid 5 are bonded to each other via glass frits 59 (low melting point glass).

The lid 5 is preferably coupled to the ground. Consequently, a potential of the lid 5 can be maintained to be constant, and, thus, for example, a change in an electrostatic capacitance between the lid 5 and the element assembly 3 can be reduced. A separation distance D between a bottom surface of the depression 51 and the element assembly 3 is not particularly limited, but is preferably 15 μm or more, more preferably 20 μm or more, and most preferably 25 μm or more. Consequently, an electrostatic capacitance between the lid 5 and the element assembly 3 can be sufficiently reduced, and thus it is possible to measure the acceleration Az with high accuracy.

Element Assembly

As illustrated in FIG. 1, the element assembly 3 includes a fixed part 31 bonded to the upper surface of the mount portion 22, a movable body 32 which is displaceable with respect to the fixed part 31, and a support beam 33 coupling the fixed part 31 to the movable body 32. When the acceleration Az is applied, the movable body 32 swings while subjecting the support beam 33 to torsional deformation with the support beam 33 as a rotation axis J.

The element assembly 3 may be formed, for example, by patterning a conductive silicon substrate doped with an impurity such as phosphorus (P), boron (B), or arsenic (As) through etching (particularly, dry etching). The element assembly 3 is bonded to the upper surface of the substrate through anodic bonding. However, a material of the element assembly 3 or a method of bonding the element assembly 3 to the substrate 2 is not particularly limited.

The movable body 32 has a rectangular shape along the X axis direction in a plan view, and is formed in a rectangular shape having a long side in the X axis direction, particularly, in the present embodiment. The movable body 32 has a first mass 321 located on the negative side of the X axis direction with respect to the rotation axis J, a second mass 322 located on the positive side of the X axis direction with respect to the rotation axis J, and a connection portion 323 connecting the first mass 321 to the second mass 322. The movable body 32 is coupled to the support beam 33 at the connection portion 323. The second mass 322 is longer than in the first mass 321 in the X axis direction, and is greater than the first mass 321 in rotational moment (torque) when the acceleration Az is applied. Due to a difference in the rotational moment, the movable body 32 swings around the rotation axis J when the acceleration Az is applied. Hereinafter, a part which is a basal end of the second mass 322 and is symmetric to the first mass 321 with respect to the rotation axis J will be referred to as a "base part 322'", and a part which is a distal end of the second mass 322 and is asymmetric to the first mass 321 with respect to the rotation axis J will be referred to as a "torque generation part 322''".

The movable body 32 has an opening 324 between the first mass 321 and the second mass 322, and the fixed part 31 and the support beam 33 are disposed in the opening 324. Such a shape can miniaturize the element assembly 3. The support beam 33 extends along the Y axis direction, and forms the rotation axis J. However, disposition of the fixed part 31 or the support beam 33 is not particularly limited, and the fixed part 31 or the support beam 33 may be located outside the movable body 32, for example.

Here, the electrodes 8 are described again. The first fixed electrode 81 is disposed to face the first mass 321 in a plan view from the Z axis direction. The second fixed electrode 82 is disposed to face the base part 322' of the second mass 322. The dummy electrode 83 is disposed to face the torque generation part 322'' of the second mass 322. During driving of the physical quantity sensor 1, for example, a voltage V1 illustrated in FIG. 3 is applied to the element assembly 3, and the first fixed electrode 81 and the second fixed electrode 82 are respectively coupled to QV amplifiers (charge-voltage conversion circuits). An electrostatic capacitor Ca is formed between the first fixed electrode 81 and the first mass 321, and an electrostatic capacitor Cb is formed between the second fixed electrode 82 and the base part 322' of the second mass 322.

When the acceleration Az is applied to the physical quantity sensor 1, the movable body 32 swings centering on the rotation axis J while subjecting the support beam 33 to torsional deformation due to a difference between rotational moments of the first and second masses 321 and 322. Due to the swinging of the movable body 32, a gap between the first mass 321 and the first fixed electrode 81 and a gap between the base part 322' of the second mass 322 and the second fixed electrode 82 are changed, and thus capacitances of the electrostatic capacitors Ca and Cb are changed. Thus, the physical quantity sensor 1 can measure the acceleration Az based on the change amounts of the capacitances of the electrostatic capacitors Ca and Cb.

A plurality of through-holes 30 which penetrate through the movable body 32 in a thickness direction along the Z axis are formed in the first mass 321 and the second mass 322. The plurality of through-holes 30 are uniformly disposed over the entire regions of the first mass 321 and the second mass 322, and are disposed in a matrix form arranged in the X axis direction and the Y axis direction, particularly, in the present embodiment. The plurality of through-holes 30 have square shapes as cross-sectional shapes, and have the same shapes and sizes as each other. Occupancy proportions of the plurality of through-holes 30 are the same as each other in the first mass 321, the base part 322', and the torque generation part 322".

The term "uniform" includes not only a case where a separation distance between the through-holes 30 adjacent to each other in the X axis direction and the Y axis direction is identical in all of the through-holes 30 but also a case where some separation distances are slightly (for example, about 10% or less) deviated relative to other separation distances in consideration of an error which may occur in manufacturing. Similarly, the term "square shape" includes not only a case of a complete square shape but also a case where a shape slightly deviated relative to a square shape, for example, four corners are not squared and are chamfered or rounded, at least one corner is deviated from 90°, or a length of at least one side is different from lengths of other sides, in consideration of an error which may occur in manufacturing. The phrase "occupancy proportions being the same" includes not only a case where occupancy proportions of the plurality of through-holes 30 match each other in the first mass 321, the base part 322', and the torque generation part 322" but also, for example, a case where an occupancy proportion is slightly (for example, about ±5% or less) deviated in consideration of an error which may occur in manufacturing.

Next, design of the through-hole 30, more specifically, design of the through-hole 30 in a region overlapping the electrodes 8 will be described in detail. The through-holes 30 are provided to control damping of a gas when the movable body 32 swings. As illustrated in FIG. 4, damping includes inside-hole damping of a gas penetrating through the through-hole 30 and squeeze film damping between the movable body 32 and the substrate 2. In a case where a size of the through-hole 30 is increased, a gas easily passes therethrough, and thus the inside-hole damping can be reduced. In a case where an occupancy proportion of the through-hole 30 is increased, a facing area between the movable body 32 and the substrate 2 is reduced, and thus the squeeze film damping can be reduced. However, a reduction of the facing area between the movable body 32 and the substrate 2 leads to a reduction of the mass of the torque generation part 322", and thus measurement sensitivity for the acceleration Az is reduced. Conversely, in a case where a size of the through-hole 30 is reduced, and thus an occupancy proportion thereof is reduced, a facing area between the movable body 32 and the substrate 2 is increased, and thus the mass of the torque generation part 322" is increased. Therefore, measurement sensitivity for the acceleration Az is improved, but damping is increased. As mentioned above, the measurement sensitivity and the damping have a trade-off relationship, and, thus, in the related art, both thereof are hardly compatible.

In contrast, in the physical quantity sensor 1, the measurement sensitivity and the damping can be made compatible by devising design of the through-hole 30. Hereinafter, this will be described in detail.

The measurement sensitivity of the physical quantity sensor 1 is proportional to (A) $1/h^2$ in a case where a gap between the movable body 32, and the first fixed electrode 81 and the second fixed electrode 82 is indicated by h, (B) a facing area between the movable body 32, and the first fixed electrode 81 and the second fixed electrode 82, (C) spring rigidity (which is proportional to a length H of the through-hole in the Z axis direction when a thickness of a structural body is uniform) of the support beam 33, and (D) the mass of the torque generation part 322". In the physical quantity sensor 1, first, H, h, and a facing area between the movable body 32, and the first fixed electrode 81 and the second fixed electrode 82 required to obtain a necessary measurement sensitivity, that is, an occupancy proportion of the through-hole 30 is determined in a state in which damping is disregarded. Consequently, the electrostatic capacitors Ca and Cb having necessary sizes are formed, and thus the physical quantity sensor 1 can obtain a sufficient measurement sensitivity.

Here, an occupancy proportion of the plurality of through-holes 30 in the first mass 321, the base part 322', and the torque generation part 322" is not particularly limited, but is preferably, for example, 75% or more, more preferably 78% or more, and most preferably 82% or more. Consequently, a measurement sensitivity and damping can be easily made compatible.

In a case where an occupancy proportion of the through-holes 30 in the movable body 32 is determined, next, design for damping is performed. As a new technical concept of minimizing damping without changing a sensitivity, in the physical quantity sensor 1, the plurality of through-holes 30 are designed such that a difference between the inside-hole damping and the squeeze film damping illustrated in FIG. 4 is reduced as much as possible, and, preferably, the inside-hole damping is the same as the squeeze film damping. As mentioned above, in a case where a difference between the inside-hole damping and the squeeze film damping is reduced as much as possible, damping can be reduced, and, in a case where the inside-hole damping is the same as the squeeze film damping, damping is minimized. Thus, according to the physical quantity sensor 1, it is possible to effectively reduce damping while maintaining a measurement sensitivity to be sufficiently high.

Here, in a case where a length of the through-hole along the Z axis direction is indicated by H [m], a length of ½ of a length of the movable body 32 along the Y axis direction is indicated by a [m], a length of the movable body 32 along the X axis direction is indicated by L [m], a gap between the electrodes 8 (for example, a fixed electrode) of the substrate 2 and the movable body 32 is indicated by h [m], a length of one side of the square shape of the through-hole 30 is indicated by S0 [m], a gap between the through-holes 30 adjacent to each other is indicated by S1 [m], a viscous resistance (viscosity coefficient) of a gas filling the storage space S is indicated by μ [kg/ms], and damping occurring in the movable body 32 is indicated by C [N·s/m], C is expressed by the following Equation (1).

$$C = 2aL\frac{8\mu H}{\beta^2 r_0^2}\left(1 + \frac{3r_0^4 K(\beta)}{16Hh^3}\right)\left[1 - \frac{l}{a}\tanh\left(\frac{a}{l}\right)\right] \quad (1)$$

Here, the parameters used in Equation (1) are expressed by Equations (2) to (8) as follows.

$$H_{eff} = H + \frac{3\pi r_0}{8} \quad (2)$$

$$l = \sqrt{\frac{2h^3 H_{eff} \eta(\beta)}{3\beta^2 r_0^2}} \quad (3)$$

$$\eta(\beta) = 1 + \frac{3r_0^4 K(\beta)}{16Hh^3} \quad (4)$$

$$K(\beta) = 4\beta^2 - \beta^4 - 4\ln\beta - 3 \quad (5)$$

$$\beta = \frac{r_0}{r_c} \quad (6)$$

$$r_c = \frac{S0 + S1}{\sqrt{\pi}} \quad (7)$$

$$r_0 = 0.547 \times S0 \quad (8)$$

The length H of the through-hole 30 in the Z axis direction, that is, a thickness of the movable body 32 is not particularly limited, but is preferably, for example, 5.0 μm or more and 80.0 μm or less. Consequently, the movable body 32 which is sufficiently thin can be obtained while maintaining mechanical strength. Therefore, it is possible to miniaturize the physical quantity sensor 1. The gap h between the electrodes 8 and the movable body 32 is not particularly limited, but is preferably, for example, 1.0 μm or more and 3.5 μm or less. Consequently, it is possible to sufficiently increase sizes of the electrostatic capacitors Ca and Cb while sufficiently securing a movable range of the movable body 32. The length S0 is not particularly limited, differs depending on the lengths a and L, but is preferably, for example, 5 μm or more and 40 μm or less, and is more preferably 10 μm or more and 30 μm or less.

Here, an inside-hole damping component included in Equation (1) is expressed by the following Expression (9), and a squeeze film damping component is expressed by the following Expression (10).

$$2aL\frac{8\mu H}{\beta^2 r_0^2}\left[1 - \frac{l}{a}\tanh\left(\frac{a}{l}\right)\right] \quad (9)$$

$$2aL\frac{8\mu H}{\beta^2 r_0^2}\left(\frac{3r_0^4 K(\beta)}{16Hh^3}\right)\left[1 - \frac{l}{a}\tanh\left(\frac{a}{l}\right)\right] \quad (10)$$

Therefore, the damping C is minimized by causing the above Expression (9) to be the same as the above Expression (10), that is, by using dimensions of H, h, S0, and S1 satisfying the following Equation (11).

$$\frac{3r_0^4 K(\beta)}{16Hh^3} = 1 \quad (11)$$

The length S0 of one side of the through-hole 30 satisfying the above Equation (11) is indicated by S0min, the gap S1 between the through-holes 30 adjacent to each other is indicated by S1min, the damping C when S0min and S1min are assigned to the above Equation (1), that is, a minimum value of the damping C is indicated by Cmin.

Damping also depends on accuracy required for the physical quantity sensor 1, but the damping can be sufficiently reduced by ranges of S0 and S1 when H and h are fixed (constant) satisfying the following Expression (12). In other words, in a case of damping within the damping minimum value Cmin+50%, since damping can be sufficiently reduced, a measurement sensitivity within a desired bandwidth can be maintained, and noise can be reduced. The following Expression (13) is preferably established, the following Expression (14) is more preferably established, and the following Expression (15) is most preferably established. Consequently, the above-described effect can be remarkably exhibited.

$$C \leq 1.5 \times Cmin \quad (12)$$

$$C \leq 1.4 \times Cmin \quad (13)$$

$$C \leq 1.3 \times Cmin \quad (14)$$

$$C \leq 1.2 \times Cmin \quad (15)$$

FIG. 5 is a graph illustrating a relationship between the length S0 of one side of the through-hole 30 and damping. H and h are fixed (constant), and a ratio of S1/S0 is 1 such that a sensitivity is constant (this indicates that an opening ratio is not changed even though the length S0 is changed). From the graph, the damping in the above Equation (1) may be divided into the squeeze film damping in the above Expression (10) and the inside-hole damping in the above Expression (9), and it can be seen that the inside-hole damping is dominant in a region in which S0 is smaller than S0min, and the squeeze film damping is dominant in a region in which S0 is larger than S0min. S0 satisfying the above Expression (12) is in a range from S0' on the side smaller than S0min to S0" on the side larger than S0min. In the range from S0min to S0', a change in damping for a dimension variation of S0 is greater than in the range from S0min to S0", and thus dimension accuracy is necessary. Therefore, S0 may be employed in the range from S0min to S0" such that dimension accuracy can be alleviated. This is also the same for a case where the above Expressions (13) to (15) are established.

A relationship between S0 and S1 is not particularly limited, but preferably establishes the following Expression (16), more preferably establishes the following Expression (17), and most preferably establishes the following Expression (18). Such a relationship is established, and thus the through-holes 30 can be formed in the movable body 32 with good balance. FIG. 6 is a graph illustrating a relationship among S1/S0, and a sensitivity ratio and a minimum damping ratio. The sensitivity ratio is a ratio with a sensitivity at S1/S0=1, and the minimum damping ratio is a ratio with minimum damping at S1/S0=1.

As can be seen from the graph, at S1/S0>3, an increase ratio of the sensitivity ratio has a saturation tendency, and the minimum damping ratio has a considerable increase tendency. Therefore, Expressions (16) to (18) are established, and thus damping can be sufficiently reduced while making a measurement sensitivity sufficiently high.

$$0.25 \leq S1/S0 \leq 3.00 \quad (16)$$

$$0.6 \leq S1/S0 \leq 2.40 \quad (17)$$

$$0.8 \leq S1/S0 \leq 2.0 \quad (18)$$

Hereinafter, a detailed description will be made of simulation or test verification related to the dimension ratio S1/S0 in the process of deriving the ranges in the above Expressions (16) to (18). FIGS. 7 to 15 illustrate plotting of values of a hole size and an inter-hole distance as S0min and S1min in a range of H from 5 to 80 µm, a range of h from 1.0 to 3.5 µm, and a range of S1/S0 from 0.25 to 3.0 µm. In a case where S0 and S1 are respectively summarized in a transverse axis and a longitudinal axis of a graph based on S0min and S1min obtained in FIGS. 7 to 15, this leads to a graph in FIG. 16. As examples, FIG. 17 illustrates S0min and S1min when S1/S0 is 0.25, H is 5 µm, and h is 1.0 to 3.5 µm, and FIG. 18 illustrates S0min and S1min when S1/S0 is 0.25, H is 80 µm, and h is 1.0 to 3.5 µm. It can be seen from FIGS. 17 and 18 that dimensions of S0min and S1min tend to increase as H or h increases.

Figure 19:
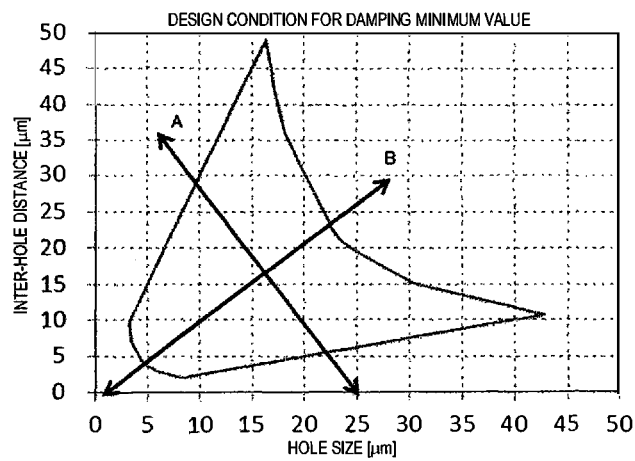
FIG. 19 is a graph illustrating relationships among S1min/S0min, and H and h.
Figure 20:
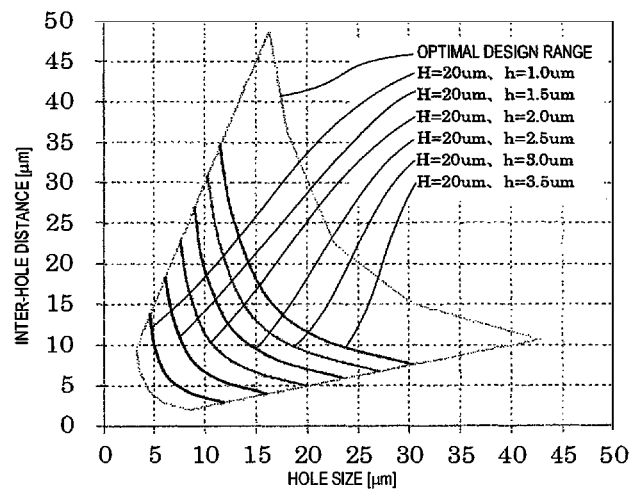
FIG. 20 is a graph illustrating relationships among S1min/S0min, and H and h.
Figure 21:
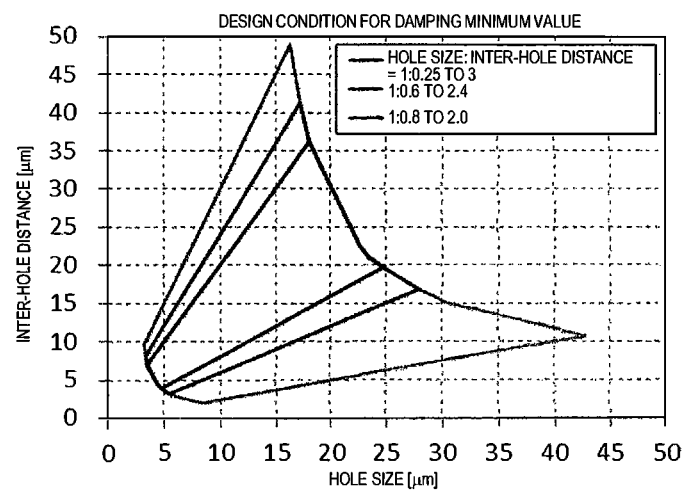
FIG. 21 is a graph illustrating relationships among S1min/S0min, and H and h.

Here, FIG. 19 illustrates ranges of all points of S0min and S1min in a range of H from 5 to 80 µm, a range of h from 1.0 to 3.5 µm, and a range of S1/S0 from 0.25 to 3.0. An arrow A direction is defined in the range of S1/S0, and an arrow B direction is defined in the ranges of H and h. As an example, conditions of S0min and S1min when S1min/S0min is 0.25 to 3, H is 20 µm, and h is 1.0 to 3.5 µm are as illustrated in FIG. 20. FIG. 21 illustrates respective regions in which S1min/S0min is restricted by the ranges in the above Expressions (16) to (18) at H=5 to 80 µm and h=1.0 to 3.5 µm.

Figure 22:
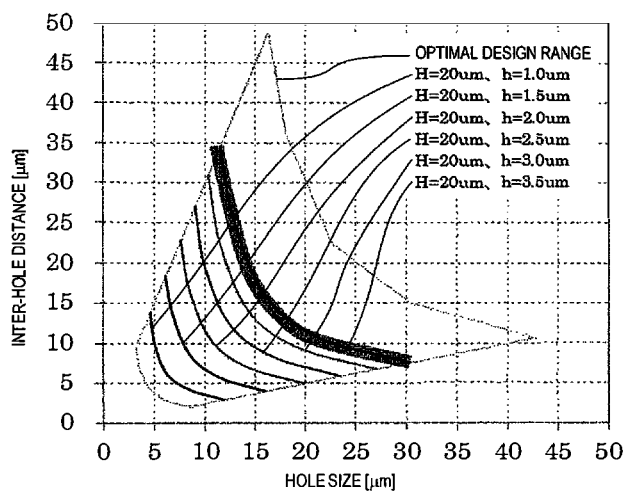
FIG. 22 is a graph illustrating relationships among S1min/S0min, and H and h.

S0min and S1min have been described hitherto, but S0 and S1 giving the ranges of the above Expressions (12) to (15) include the peripheries of S0min and S1min in an image, for example, when H is 20 µm, and h is 3.5 µm, and thus a range Q in FIG. 22 is obtained, so that only two sides are spread as a whole.

As mentioned above, the physical quantity sensor 1 has been described. The physical quantity sensor 1 includes, as described above, the substrate 2, the movable body 32 facing the substrate 2, the fixed part 31 fixed to the substrate 2, and the support beam 33 coupling the movable body 32 to the fixed part 31. The movable body 32 is displaceable with the support beam 33 as the rotation axis J, and includes, in a plan view, the first mass 321 located on one side of the X axis direction (second direction) orthogonal to the Y axis direction (first direction) which is a direction along the rotation axis J with respect to the rotation axis J, the second mass 322 located on the other side of the X axis direction with respect to the rotation axis J, and the connection portion 323 which connects the first mass 321 to the second mass 322. Each of the first mass 321 and the second mass 322 has a plurality of through-holes 30 which penetrate through the movable body 32 in the Z axis direction (third direction) orthogonal to the X axis direction and the Y axis direction and each of which has a square shape as an opening shape. The physical quantity sensor 1 establishes the above Expression (12). Consequently, the plurality of through-holes 30 are appropriately designed, and thus damping can be sufficiently reduced while maintaining a favorable measurement sensitivity. Therefore, it is possible to provide the physical quantity sensor 1 which has a favorable measurement sensitivity and can secure a desired frequency bandwidth.

As described above, the physical quantity sensor 1 preferably establishes the above Expression (13), more preferably establishes the above Expression (14), and most preferably establishes the above Expression (15). Consequently, it is possible to provide the physical quantity sensor 1 which can notably exhibit the above-described effect, has a favorable measurement sensitivity, and can secure a desired frequency bandwidth.

As described above, the physical quantity sensor 1 preferably establishes the above Expression (16), more preferably establishes the above Expression (17), and most preferably establishes the above Expression (18). Consequently, it is possible to sufficiently reduce damping while sufficiently increasing a measurement sensitivity.

Regarding design of the through-hole 30, a description has been made of a case where a cross-sectional shape of the through-hole 30 is a square shape, but the same effect can also be achieved in a case where a cross-sectional shape of the through-hole 30 is a circular shape. Specifically, this case is a case where a circular through-hole has a value in the above Equation (8) as a radius, and has twice the value in the above Equation (7) as a distance between through-hole centers. The same effect can be achieved even in a case where a cross-sectional shape of the through-hole 30 is a polygonal shape (for example, a triangular shape, a quadrangular shape other than a square shape, and a polygonal shape of a pentagonal shape or more) having an area variation within ±25% with respect to an area of a square shape in an optimal condition (when S0=S0min).

Second Embodiment

Next, a description will be made of a physical quantity sensor device according to a second embodiment of the present disclosure.

Figure 23:
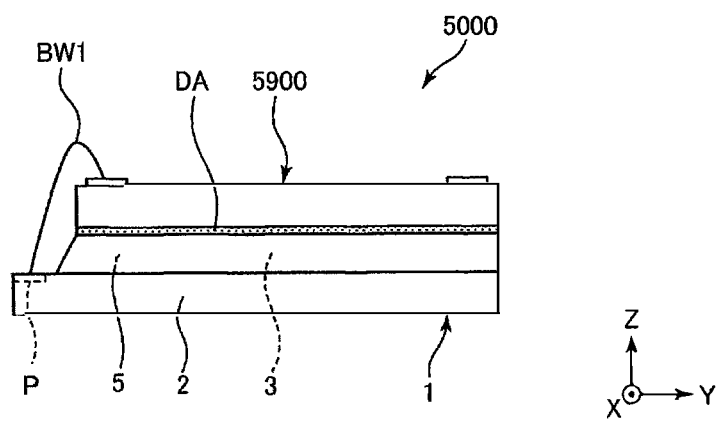
FIG. 23 is a sectional view illustrating a physical quantity sensor device according to a second embodiment of the present disclosure.

FIG. 23 is a sectional view illustrating a physical quantity sensor device according to a second embodiment of the present disclosure.

As illustrated in FIG. 23, a physical quantity sensor device 5000 includes the physical quantity sensor 1 and a semiconductor element 5900 (circuit element). The semiconductor element 5900 is bonded to the upper surface of the lid 5 via a die attach material DA (bonding member). The semiconductor element 5900 is electrically coupled to the electrode pad P of the physical quantity sensor 1 via a bonding wire BW1. The semiconductor element 5900 includes, as necessary, for example, a drive circuit which applies a drive voltage to the element assembly 3, a measurement circuit which measures the acceleration Az based on an output from the element assembly 3, and an output circuit which converts a signal from the measurement circuit into a predetermined signal which is then output.

As mentioned above, the physical quantity sensor device 5000 has been described. The physical quantity sensor device 5000 includes the physical quantity sensor 1 and the semiconductor element 5900 (circuit element). Thus, it is possible to achieve the effect of the physical quantity sensor 1, and thus to provide the physical quantity sensor device 5000 with high reliability.

Third Embodiment

Next, a description will be made of a physical quantity sensor device according to a third embodiment of the present disclosure.

Figure 24:
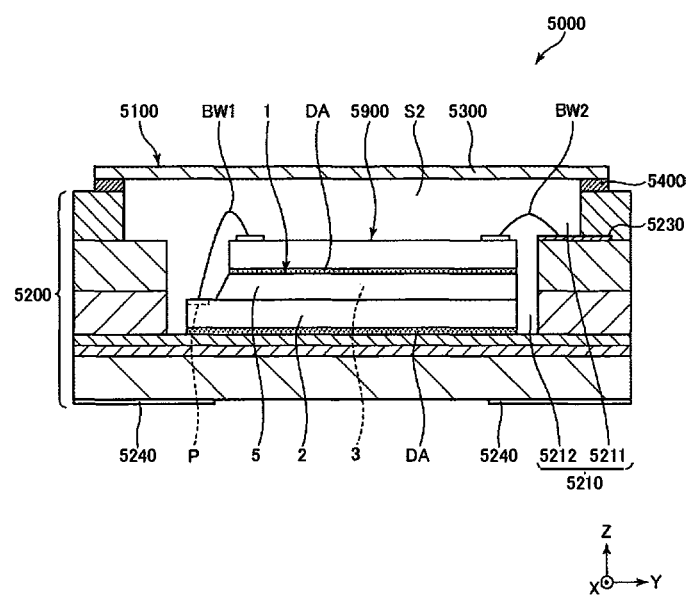
FIG. 24 is a sectional view illustrating a physical quantity sensor device according to a third embodiment of the present disclosure.

FIG. 24 is a sectional view illustrating a physical quantity sensor device according to a third embodiment of the present disclosure.

A physical quantity sensor device 5000 according to the present embodiment is the same as the physical quantity sensor device 5000 according to the second embodiment except that a package 5100 is further provided. In the following description, regarding of the physical quantity sensor device 5000 according to the third embodiment, a difference from the second embodiment will be focused, and the same contents will not be described. In FIG. 24, the same constituent element as that in the second embodiment is given the same reference numeral.

As illustrated in FIG. 24, the physical quantity sensor device 5000 includes the package 5100 storing the physical quantity sensor 1 and the semiconductor element 5900 (circuit element). Thus, the package 5100 can appropriately protect the physical quantity sensor 1 and the semiconductor element 5900 from impact, dust, heat, moisture (water), and the like.

The package 5100 includes a cavity-like base 5200, and a lid 5300 bonded to an upper surface of the base 5200. The base 5200 has a depression 5210 which is open to the upper surface. The depression 5210 includes a first depressed part 5211 which is open to the upper surface of the base 5200 and a second depressed part 5212 which is open to a bottom surface of the first depressed part 5211.

On the other hand, the lid 5300 has a tabular shape, and is bonded to the upper surface of the base 5200 so as to close the opening of the depression 5210. As mentioned above, the opening of the depression 5210 is closed by the lid 5300, so that a storage space S2 is formed in the package 5100, and the physical quantity sensor 1 and the semiconductor element 5900 are stored in the storage space S2. A method of bonding the base 5200 to the lid 5300 is not particularly limited, and, in the present embodiment, seam welding using a seam ring 5400 is used.

The storage space S2 is air-tightly sealed. An atmosphere of the storage space S2 is not particularly limited, and is preferably the same as, for example, an atmosphere of the storage space S of the physical quantity sensor 1. Consequently, even if the airtightness of the storage space S is broken, and thus the storage spaces S and S2 communicate with each other, the atmosphere of the storage space S can be maintained without any change. Thus, it is possible to reduce a change in a measurement characteristic of the physical quantity sensor 1 due to a change in the atmosphere of the storage space S, and thus to exhibit a stable measurement characteristic.

A constituent material of the base 5200 is not particularly limited, and various ceramics such as alumina, zirconia, or titania may be used. A constituent material of the lid 5300 is not particularly limited, and a member having a linear expansion coefficient similar to that of a constituent material of the base 5200 may be used. For example, in a case where the above-described ceramic is used as a constituent material of the base 5200, an alloy such as Kovar is preferably used.

The base 5200 includes a plurality of internal terminals 5230 disposed in the storage space S2 and a plurality of external terminals 5240 disposed on a bottom surface thereof. Each internal terminal 5230 is electrically coupled to a predetermined external terminal 5240 via an internal wire (not illustrated) disposed in the base 5200.

The physical quantity sensor 1 is fixed to the bottom surface of the depression 5210 via a die attach material DA, and the semiconductor element 5900 is disposed on the upper surface of the physical quantity sensor 1 via the die attach material DA. The physical quantity sensor 1 is electrically coupled to the semiconductor element 5900 via a bonding wire BW1, and the semiconductor element 5900 is electrically coupled to the internal terminals 5230 via a bonding wire BW2.

Fourth Embodiment

Next, a description will be made of a composite sensor device according to a fourth embodiment of the present disclosure.

Figure 25:
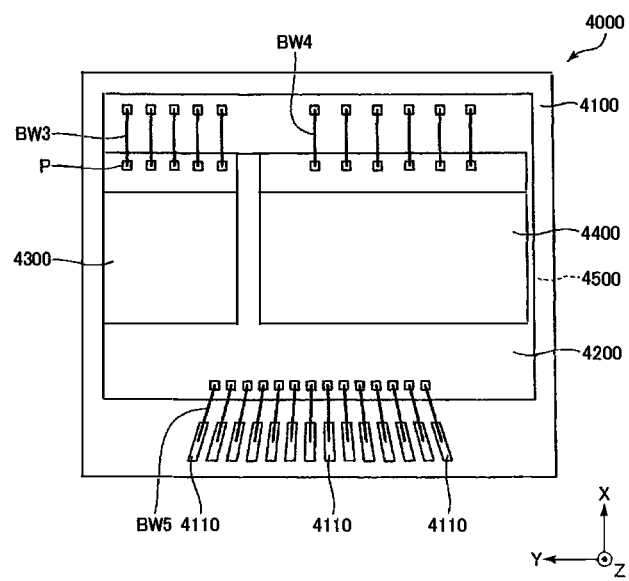
FIG. 25 is a plan view illustrating a composite sensor device according to a fourth embodiment of the present disclosure.
Figure 26:
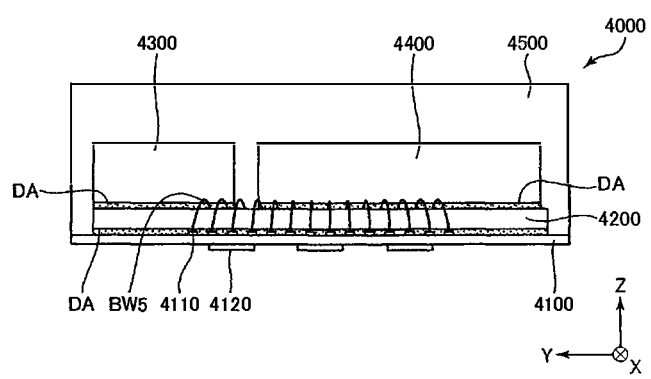
FIG. 26 is a sectional view of the composite sensor device illustrated in FIG. 25.

FIG. 25 is a plan view illustrating a composite sensor device according to a fourth embodiment of the present disclosure. FIG. 26 is a sectional view of the composite sensor device illustrated in FIG. 25.

As illustrated in FIGS. 25 and 26, a composite sensor device 4000 includes a base substrate 4100, a semiconductor element 4200 (circuit element) attached to an upper surface of the base substrate 4100 via a die attach material DA (resin adhesive), an acceleration sensor 4300 (first physical quantity sensor) and an angular velocity sensor 4400 (second physical quantity sensor) attached to an upper surface of the semiconductor element 4200 via a die attach material DA, and a resin package 4500 covering the semiconductor element 4200, the acceleration sensor 4300, and the angular velocity sensor 4400. The acceleration sensor 4300 is a three-axis acceleration sensor which can separately measure accelerations in three axes (the X axis, the Y axis, and the Z axis) orthogonal to each other. The angular velocity sensor 4400 is a three-axis angular velocity sensor which can separately measure angular velocities in three axes (the X axis, the Y axis, and the Z axis) orthogonal to each other. The physical quantity sensor according to the present disclosure may be used as the acceleration sensor 4300 and the angular velocity sensor 4400.

The base substrate 4100 is provided with a plurality of connection terminals 4110 on an upper surface thereof, and is provided with a plurality of external terminals 4120 on a lower surface thereof. Each connection terminal 4110 is electrically coupled to a corresponding external terminal 4120 via an internal wire or the like (not illustrated) disposed in the base substrate 4100. The semiconductor element 4200 is disposed on the upper surface of the base substrate 4100.

The semiconductor element 4200 includes, as necessary, for example, a drive circuit which drives the acceleration sensor 4300 and the angular velocity sensor 4400, an acceleration measurement circuit which separately measures an acceleration in the X axis direction, an acceleration in the Y axis direction, and an acceleration in the Z axis direction based on outputs from the acceleration sensor 4300, an angular velocity measurement circuit which separately measures an angular velocity about the X axis, an angular velocity about the Y axis, and an angular velocity about the Z axis based on outputs from the angular velocity sensor 4400, and an output circuit which converts a signal from each of the acceleration measurement circuit and the angular velocity measurement circuit into a predetermined signal which is then output.

The semiconductor element 4200 is electrically coupled to the acceleration sensor 4300 via bonding wires BW3, electrically coupled to the angular velocity sensor 4400 via bonding wires BW4, and electrically coupled to the connection terminals 4110 of the base substrate 4100 via bonding wires BW5. The acceleration sensor 4300 and the angular velocity sensor 4400 are disposed side by side on the upper surface of the semiconductor element 4200.

As mentioned above, the composite sensor device 4000 has been described. As described above, the composite sensor device 4000 includes the acceleration sensor 4300 (first physical quantity sensor), and the angular velocity sensor 4400 (second physical quantity sensor) which measures a physical quantity which is different from that of the acceleration sensor 4300. Consequently, it is possible to provide the composite sensor device 4000 which can measure different kinds of physical quantities and thus has high convenience. Particularly, in the present embodiment, the first physical quantity sensor is the acceleration sensor 4300 which measures accelerations, and the second physical quantity sensor is the angular velocity sensor 4400 which measures angular velocities. Thus, for example, it is possible to provide the composite sensor device 4000 which may be used for a motion sensor and thus has considerably high convenience.

Disposition of the acceleration sensor 4300 and the angular velocity sensor 4400 is not particularly limited, and, for example, the acceleration sensor 4300 and the angular velocity sensor 4400 may be attached to the upper surface of the base substrate 4100 with the semiconductor element 4200 interposed therebetween. With this configuration, it is possible to reduce a height of the composite sensor device 4000.

Fifth Embodiment

Next, a description will be made of an inertial measurement unit according to a fifth embodiment of the present disclosure.

Figure 27:
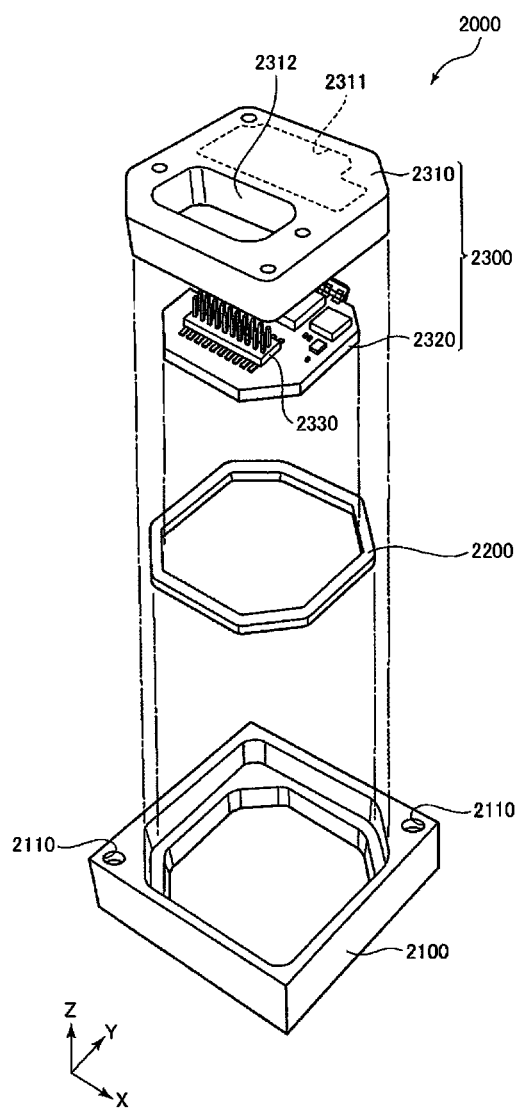
FIG. 27 is an exploded perspective view illustrating an inertial measurement unit according to a fifth embodiment of the present disclosure.
Figure 28:
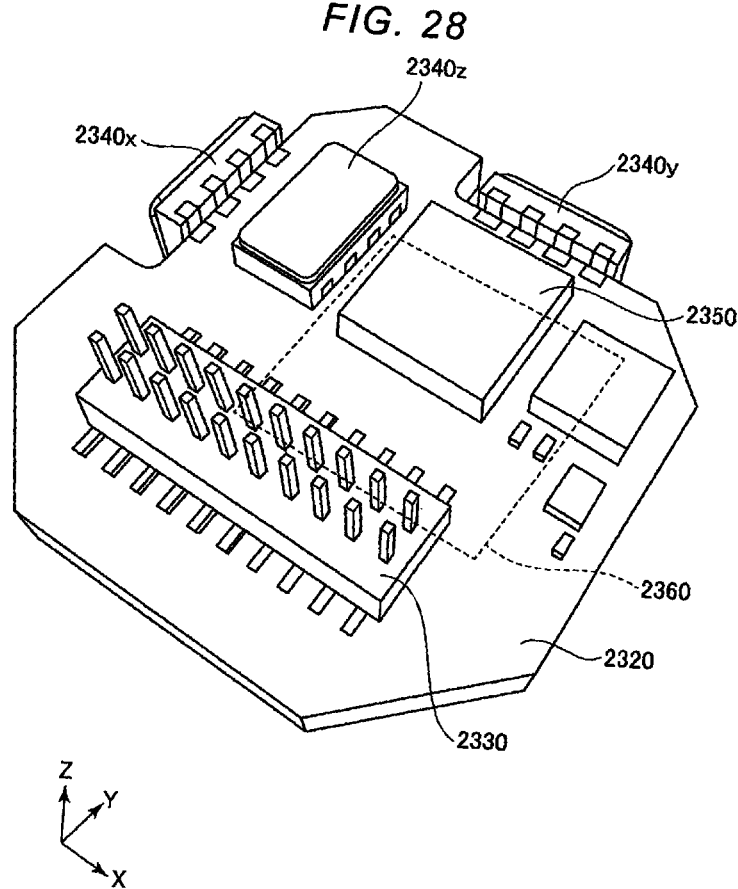
FIG. 28 is a perspective view of a substrate of the inertial measurement unit illustrated in FIG. 27.

FIG. 27 is an exploded perspective view illustrating an inertial measurement unit according to a fifth embodiment of the present disclosure. FIG. 28 is a perspective view of a substrate of the inertial measurement unit illustrated in FIG. 27.

An inertial measurement unit (IMU) 2000 illustrated in FIG. 27 is an inertial measurement unit which detects an attitude or a behavior (moment of inertia) of a motion object (mounting apparatus) such as an automobile or a robot. The inertial measurement unit 2000 functions as a so-called six-axis motion sensor including a three-axis acceleration sensor and a three-axis angular velocity sensor.

The inertial measurement unit 2000 is a cuboid of which a planner shape is substantially a square shape. Screw holes 2110 as fixation parts are formed near two vertexes located in a diagonal direction of the square shape. The inertial measurement unit 2000 may be mounted to a mounting surface of a mounting object such as an automobile by inserting two screws into the two screw holes 2110. The inertial measurement unit 2000 may be reduced to a size so as to be mountable on, for example, a smart phone or a digital camera through selection of components or a design change.

The inertial measurement unit 2000 includes an outer case 2100, a bonding member 2200, and a sensor module 2300, and has a configuration in which the sensor module 2300 is inserted into the outer case 2100 via the bonding member 2200. The sensor module 2300 has an inner case 2310 and a substrate 2320.

An outer shape of the outer case 2100 is a cuboidal shape of which a planar shape is substantially a square shape in the same manner as the entire shape of the inertial measurement unit 2000, and the screw holes 2110 are formed near two vertexes located in the diagonal direction of the square. The outer case 2100 has a box shape, and stores the sensor module 2300 therein.

The inner case 2310 is a member supporting the substrate 2320, and has a shape accommodate inside the outer case 2100. The inner case 2310 is provided with a depression 2311 for preventing contact with the substrate 2320 or an opening 2312 for exposing a connector 2330 which will be described later. The inner case 2310 is bonded to the outer case 2100 via the bonding member 2200 (for example, a packing impregnated with an adhesive). A lower surface of the inner case 2310 is bonded to the substrate 2320 via an adhesive.

As illustrated in FIG. 28, the connector 2330, an angular velocity sensor 2340z measuring an angular velocity about the Z axis, an acceleration sensor 2350 measuring an acceleration in each of the X axis direction, the Y axis direction, and the Z axis direction, and the like are mounted on an upper surface of the substrate 2320. An angular velocity sensor 2340x measuring an angular velocity about the X axis, and an angular velocity sensor 2340y measuring an angular velocity about the Y axis are mounted on a side surface of the substrate 2320. The physical quantity sensor of the present embodiment may be used as the sensors 2340z, 2340x, 2340y, and 2350.

A control IC 2360 is mounted on a lower surface of the substrate 2320. The control IC 2360 is a micro controller unit (MCU), has a storage section including a nonvolatile memory or an A/D converter built thereinto, and controls each element of the inertial measurement unit 2000. The storage section stores a program for defining an order and contents for measuring acceleration and angular velocity, a program for digitalizing measured data to be incorporated into packet data, accompanying data, and the like. A plurality of other electronic components are mounted on the substrate 2320.

As mentioned above, the inertial measurement unit 2000 has been described. As described above, the inertial measurement unit 2000 includes angular velocity sensors 2340z, 2340x, and 2340y, and the acceleration sensor 2350 as physical quantity sensors, and the control IC 2360 (control circuit) controlling driving of the sensors 2340z, 2340x, 2340y, and 2350.

Consequently, it is possible to achieve the effect of the physical quantity sensor of the present disclosure, and thus to provide the inertial measurement unit 2000 with high reliability.

Sixth Embodiment

Next, a description will be made of a vehicle positioning apparatus according to a sixth embodiment of the present disclosure.

Figure 29:
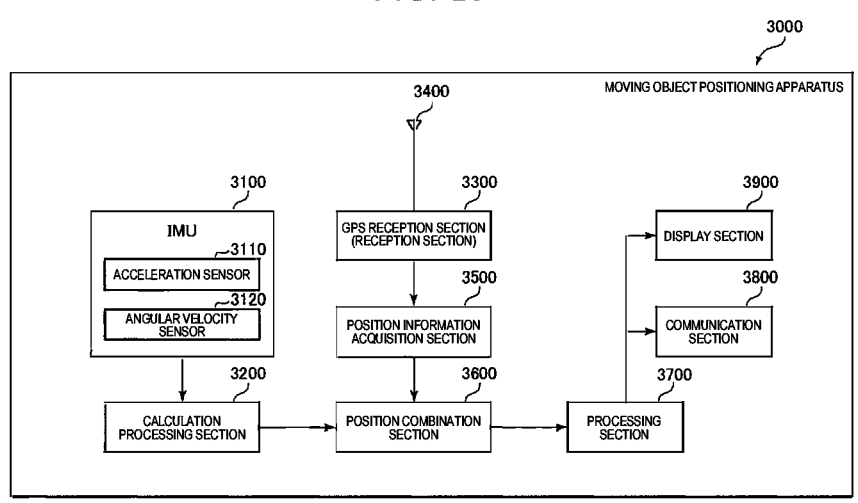
FIG. 29 is a block diagram illustrating the entire system of a vehicle positioning apparatus according to a sixth embodiment of the present disclosure.
Figure 30:
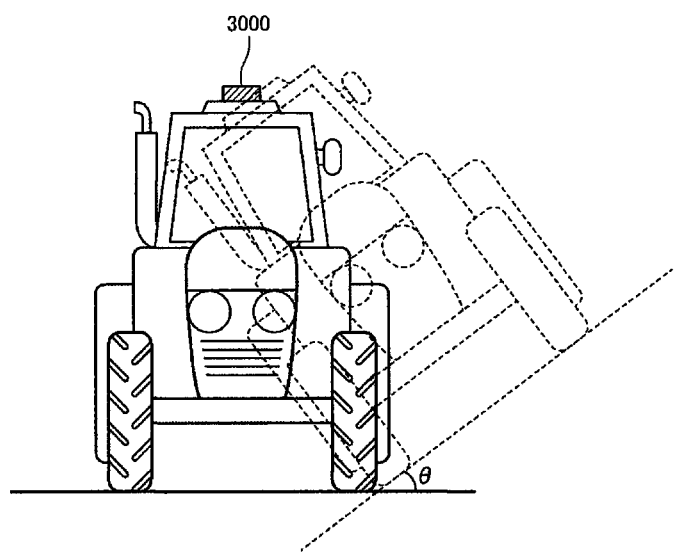
FIG. 30 is a diagram illustrating an operation of the vehicle positioning apparatus illustrated in FIG. 29.

FIG. 29 is a block diagram illustrating the entire system of a vehicle positioning apparatus according to a sixth embodiment of the present disclosure. FIG. 30 is a diagram illustrating an operation of the vehicle positioning apparatus illustrated in FIG. 29.

A vehicle positioning apparatus 3000 illustrated in FIG. 29 is an apparatus which is mounted on a vehicle and is used to perform positioning of the vehicle. A vehicle is not particularly limited, and may be any of a bicycle, an automobile (including a four-wheeled vehicle and a motorcycle), an electric train, an airplane, and a ship, and, in the present embodiment, a four-wheeled vehicle will be described. The vehicle positioning apparatus 3000 includes an inertial measurement unit (IMU) 3100, a calculation processing section (calculation processor) 3200, a GPS reception section 3300, a reception antenna 3400, a position information acquisition section 3500, a position combination section 3600, a processing section (processor) 3700, a communication section 3800, and a display section 3900. The inertial measurement unit 2000 may be used as the inertial measurement unit 3100.

The inertial measurement unit 3100 includes a three-axis acceleration sensor 3110 and a three-axis angular velocity sensor 3120. The calculation processing section 3200 receives acceleration data from the acceleration sensor 3110 and receives angular velocity data from the angular velocity sensor 3120, performs inertial navigation calculation process on the data, and outputs inertial navigation positioning data (data including acceleration and an attitude of the vehicle).

The GPS reception section 3300 receives a signal (a GPS carrier wave; a satellite signal on which position information is superimposed) from a GPS satellite via the reception antenna 3400. The position information acquisition section 3500 outputs GPS positioning data indicating a position (latitude, longitude, and altitude), velocity, and an azimuth of the vehicle positioning apparatus 3000 (vehicle) based on the signal received by the GPS reception section 3300.

The GPS positioning data includes status data indicating a reception state, a reception time, and the like.

The position combination section 3600 calculates a position of the vehicle, specifically, a position where the vehicle is traveling on the ground based on the inertial navigation positioning data output from the calculation processing section 3200 and the GPS positioning data output from the position information acquisition section 3500. For example, in a case where positions of the vehicle included in the GPS positioning data are the same as each other, but attitudes of the vehicle are different from each other due to the influence of an inclination of the ground, the vehicle travels at different positions on the ground, as illustrated in FIG. 30. Thus, an accurate position of the vehicle cannot be calculated by using only the GPS positioning data. Therefore, the position combination section 3600 calculates a position where the vehicle travels on the ground by using the inertial navigation positioning data (particularly, data regarding an attitude of the vehicle). The determination can be relatively easily performed through calculation using a trigonometric function (an inclination θ for a vertical direction).

Position data output from the position combination section 3600 is subjected to a predetermined process in the processing section 3700, and is displayed on the display section 3900 as a positioning result. The position data may be transmitted to an external apparatus via the communication section 3800.

As mentioned above, the vehicle positioning apparatus 3000 has been described. As described above, the vehicle positioning apparatus 3000 includes the inertial measurement unit 3100, the GPS reception section 3300 (reception section) which receives a satellite signal on which position information is superimposed from a positioning satellite, the position information acquisition section 3500 (acquisition section) which acquires position information of the GPS reception section 3300 based on the received satellite signal, the calculation processing section 3200 (operating section) which calculates an attitude of a vehicle based on inertial navigation positioning data (inertial data) output from the inertial measurement unit 3100, and the position combination section 3600 (calculation section) which calculates a position of the vehicle by correcting the position information based on the calculated attitude. Consequently, it is possible to achieve the effect of the inertial measurement unit 2000 and thus to provide the vehicle positioning apparatus 3000 with high reliability.

Seventh Embodiment

Next, a description will be made an electronic apparatus according to a seventh embodiment of the present disclosure.

Figure 31:
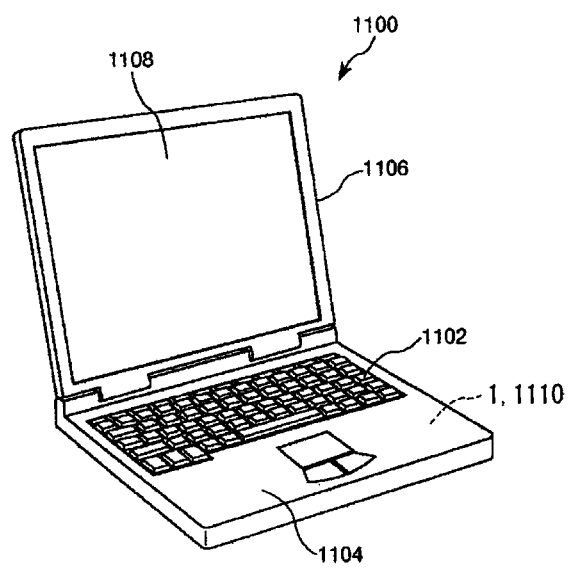
FIG. 31 is a perspective view illustrating an electronic apparatus according to a seventh embodiment of the present disclosure.

FIG. 31 is a perspective view illustrating an electronic apparatus according to a seventh embodiment of the present disclosure.

A laptop type personal computer 1100 illustrated in FIG. 31 is an apparatus to which an electronic apparatus of the present embodiment is applied. The personal computer 1100 is configured with a main body section 1104 including a keyboard 1102 and a display unit 1106 including a display section 1108, and the display unit 1106 is rotatably supported with respect to the main body section 1104 via a hinge structure section. The personal computer 1100 includes the physical quantity sensor 1, and a control circuit 1110 (control section (controller)) which performs control based on a measurement signal output from the physical quantity sensor 1.

Such a personal computer 1100 (electronic apparatus) includes the physical quantity sensor 1, and the control circuit 1110 (control section) which performs control based on a measurement signal output from the physical quantity sensor 1. Thus, it is possible to achieve the effect of the physical quantity sensor 1 and thus to realize high reliability.

Eighth Embodiment

Next, a description will be made of an electronic apparatus according to an eighth embodiment of the present disclosure.

Figure 32:
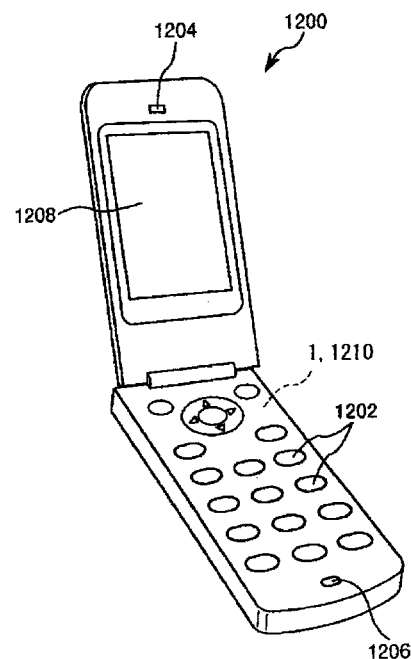
FIG. 32 is a perspective view illustrating an electronic apparatus according to an eighth embodiment of the present disclosure.

FIG. 32 is a perspective view illustrating an electronic apparatus according to an eighth embodiment of the present disclosure.

A mobile phone 1200 (including a PHS) illustrated in FIG. 32 is a phone to which an electronic apparatus of the present embodiment is applied. The mobile phone 1200 includes an antenna (not illustrated), a plurality of operation buttons 1202, an earpiece 1204, and a mouthpiece 1206, and a display section 1208 is disposed between the operation buttons 1202 and the earpiece 1204. The mobile phone 1200 includes the physical quantity sensor 1, and a control circuit 1210 (control section (controller)) which performs control based on a measurement signal output from the physical quantity sensor 1.

Such a mobile phone 1200 (electronic apparatus) includes the physical quantity sensor 1, and the control circuit 1210 (control section) which performs control based on a measurement signal output from the physical quantity sensor 1. Thus, it is possible to achieve the effect of the physical quantity sensor 1 and thus to realize high reliability.

Ninth Embodiment

Next, a description will be made of an electronic apparatus according to a ninth embodiment of the present disclosure.

Figure 33:
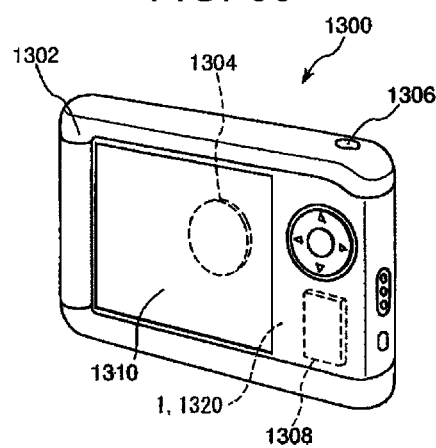
FIG. 33 is a perspective view illustrating an electronic apparatus according to a ninth embodiment of the present disclosure.

FIG. 33 is a perspective view illustrating an electronic apparatus according to a ninth embodiment of the present disclosure.

A digital still camera 1300 illustrated in FIG. 33 is a phone to which an electronic apparatus of the present embodiment is applied. The digital still camera 1300 includes a case 1302, and a display section 1310 is provided on a rear surface of the case 1302. The display section 1310 performs display based on an imaging signal generated by a CCD, and functions as a view finder which displays a subject as an electronic image. A light reception unit 1304 which includes an optical lens (imaging optical system), a CCD, and the like is provided on a front surface side (the rear surface side in FIG. 33) of the case 1302. When a photographer confirms a subject image displayed on the display section 1310 and presses a shutter button 1306, an imaging signal of the CCD at this point is transmitted to and stored in a memory 1308. The digital still camera 1300 includes the physical quantity sensor 1, and a control circuit 1320 (control section (controller)) which performs control based on a measurement signal output from the physical quantity sensor 1. The physical quantity sensor 1 is used for, for example, camera shaking correction.

The digital still camera 1300 (electronic apparatus) includes the physical quantity sensor 1, and a control circuit 1320 (control section (controller)) which performs control based on a measurement signal output from the physical quantity sensor 1. Thus, it is possible to achieve the effect of the physical quantity sensor 1 and thus to realize high reliability.

The electronic apparatus according to the present disclosure is applicable not only to the personal computer and the mobile phone of the above-described embodiments and the digital still camera of the present embodiment but also to, for example, a smart phone, a tablet terminal, a watch (including a smart watch), an ink jet type ejection apparatus (for example, an ink jet printer), a laptop type personal computer, a television set, a wearable terminal such as a head mounted display (HMD), a video camera, a video tape recorder, a car navigation apparatus, a pager, an electronic organizer (including a communication function), an electronic dictionary, an electronic calculator, an electronic gaming machine, a word processor, a workstation, a videophone, a security television monitor, electronic binoculars, a POS terminal, a medical apparatus (for example, an electronic thermometer, a sphygmomanometer, a blood glucose monitoring system, an electrocardiographic apparatus, an ultrasonic diagnostic apparatus, or an electronic endoscope), a fish-finder, various measurement apparatuses, an apparatus for mobile terminal base station, meters and gauges (for example, meters and gauges of vehicles, aircrafts, and ships), a flight simulator, and a network server.

Tenth Embodiment

Next, a description will be made of a portable electronic apparatus according to a tenth embodiment of the present disclosure.

Figure 34:
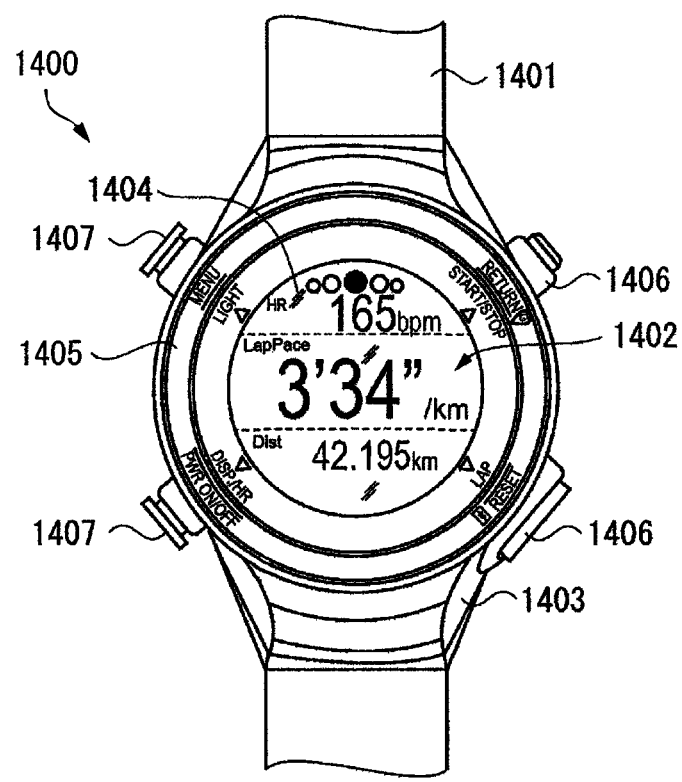
FIG. 34 is a plan view illustrating a portable electronic apparatus according to a tenth embodiment of the present disclosure.
Figure 35:
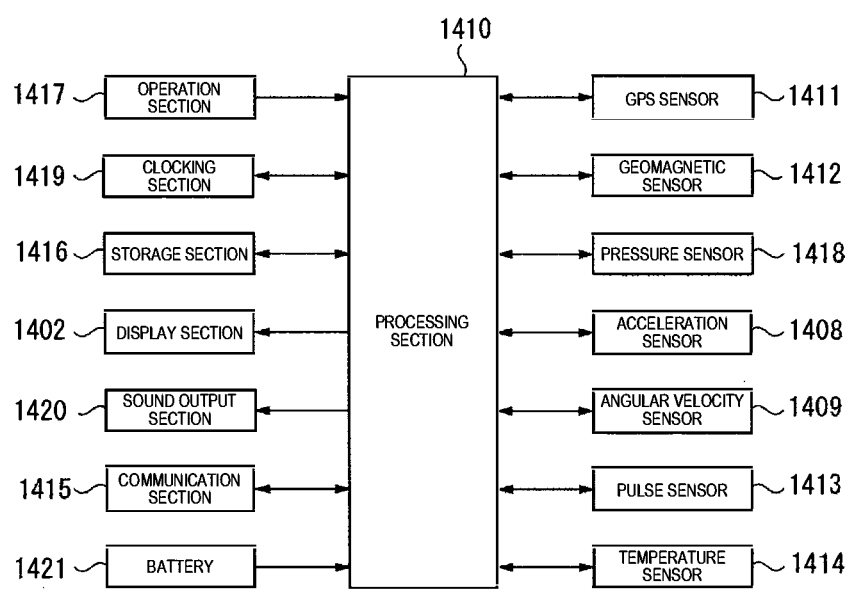
FIG. 35 is a functional block diagram illustrating a schematic configuration of the portable electronic apparatus illustrated in FIG. 34.

FIG. 34 is a plan view illustrating a portable electronic apparatus according to a tenth embodiment of the present disclosure. FIG. 35 is a functional block diagram illustrating a schematic configuration of the portable electronic apparatus illustrated in FIG. 34.

A wristwatch type activity meter 1400 (activity tracker) illustrated in FIG. 34 is a wrist apparatus to which a portable electronic apparatus of the present embodiment is applied. The activity meter 1400 is mounted on a part (subject) such as a user's wrist via a band 1401. The activity meter 1400 is provided with a display section 1402 performing digital display, and can perform wireless communication. A physical quantity sensor according to the present embodiment of the present disclosure is incorporated into the activity meter 1400 as an acceleration sensor 1408 measuring acceleration or an angular velocity sensor 1409 measuring angular velocity.

The activity meter 1400 includes a case 1403 in which the acceleration sensor 1408 and the angular velocity sensor 1409 are accommodated, a processing section (processor) 1410 which is accommodated in the case 1403 and processes data output from the acceleration sensor 1408 and the angular velocity sensor 1409, the display section 1402 which is accommodated in the case 1403, and a light transmissive cover 1404 which closes an opening of the case 1403. A bezel 1405 is provided outside the light transmissive cover 1404. A plurality of operation buttons 1406 and 1407 are provided on a side surface of the case 1403.

As illustrated in FIG. 35, the acceleration sensor 1408 measures respective accelerations in three axial directions which intersect (ideally, orthogonal to) each other, and outputs signals (acceleration signal) corresponding to magnitudes and directions of the measured three-axis accelerations. The angular velocity sensor 1409 measures respective angular velocities in three axial directions which intersect (ideally, orthogonal to) each other, and outputs signals (angular velocity signals) corresponding to magnitudes and directions of the measured three-axis angular velocities.

A liquid crystal display (LCD) configuring the display section 1402 displays, according to various measurement modes, for example, position information using a GPS sensor 1411 or a geomagnetic sensor 1412, motion information such as a movement amount or a motion amount using the acceleration sensor 1408 or the angular velocity sensor 1409, biological information such as a pulse rate using a pulse sensor 1413, or time information such as the current time. An environment temperature using a temperature sensor 1414 may be displayed.

A communication section 1415 performs various pieces of control for establishing communication between a user terminal and an information terminal (not illustrated). The communication section 1415 is configured to include a transceiver conforming to a short-range radio communication standard such as Bluetooth (registered trademark) (including Bluetooth Low Energy (BTLE)), Wireless Fidelity (Wi-Fi) (registered trademark), Zigbee (registered trademark), near field communication (NFC), or ANT+ (registered trademark), and a connector conforming to a communication bus standard such as Universal Serial Bus (USB).

The processing section (processor) 1410 is configured with, for example, a micro processing unit (MPU), a digital signal processor (DSP), or an application specific integrated circuit (ASIC). The processing section 1410 performs various processes based on a program stored in a storage section 1416 and a signal which is input from an operation section 1417 (for example, the operation buttons 1406 and 1407). The processes in the processing section 1410 include, for example, a data process on an output signal from each of the GPS sensor 1411, the geomagnetic sensor 1412, a pressure sensor 1418, the acceleration sensor 1408, the angular velocity sensor 1409, the pulse sensor 1413, the temperature sensor 1414, and a clocking section 1419, a display process of displaying an image on the display section 1402, a sound output process of outputting sounds from a sound output section 1420, a communication process of performing communication with an information terminal via the communication section 1415, and a power control process of supplies power to each section from a battery 1421.

The activity meter 1400 may have at least the following functions.

1. Distance: A total distance is measured from measurement starting by using a highly accurate GPS function.

2. Pace: The current traveling pace is displayed through pace distance measurement.

3. Average speed: An average speed is calculated from average speed traveling starting to the current time, and is displayed.

4. Elevation: Elevation is measured and displayed by using the GPS function.

5. Stride: Strides are measured even in a tunnel or the like which GPS electric waves do not reach, and are displayed.

6. Pitch: The number of steps per minute is measured and displayed.

7. Pulse rate: A pulse rate is measured by using the pulse sensor, and is displayed.

8. Gradient: A gradient of the ground is measured and displayed in training or trailing in a mountainous region.

9. Auto lap: Lap measurement is automatically performed in a case where a user runs a predetermined distance or a predetermined time set in advance.

10. Motion calorie consumption: Calorie consumption is displayed.

11. Number of steps: A sum of the number of steps from motion starting is displayed.

The activity meter 1400 (portable electronic apparatus) includes the physical quantity sensor 1, the case 1403 in which the physical quantity sensor 1 is accommodated, the processing section 1410 which is accommodated in the case 1403 and processes data output from the physical quantity sensor 1, the display section 1402 which is accommodated in the case 1403, and the light transmissive cover 1404 which closes the opening of the case 1403. Thus, it is possible to achieve the effect of the physical quantity sensor 1 and thus to realize high reliability.

As described above, the activity meter 1400 includes the GPS sensor 1411 (satellite positioning system), and can thus measure a movement distance or a movement trajectory of a user. Thus, it is possible to provide the highly convenient activity meter 1400.

The activity meter 1400 may be widely applied to a running watch, a runner's watch, a multi-sports compatible runner's watch such as duathlon and triathlon, an outdoor watch, and a satellite positioning system, for example, a GPS watch with a GPS.

In the above description, a global positioning system (GPS) has been described as a satellite positioning system, but other global navigation satellite systems (GNSS) may be used. For example, one, or two or more satellite positioning systems such as a European geostationary-satellite navigation overlay service (EGNOS), a quasi zenith satellite system (QZSS), a global navigation satellite system (GLONASS), GALILEO, and a Beidou navigation satellite system (BeiDou) may be used. As at least one of the satellite positioning systems, a satellite-based augmentation system (SBAS) such as a wide area augmentation system (WAAS) or a European geostationary-satellite navigation overlay service (EGNOS) may be used.

Eleventh Embodiment

Next, a description will be made of a vehicle according to an eleventh embodiment of the present disclosure.

Figure 36:
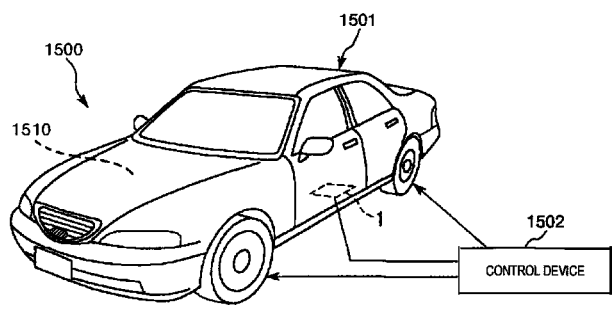
FIG. 36 is a perspective view illustrating a vehicle according to an eleventh embodiment.

FIG. 36 is a perspective view illustrating a vehicle according to an eleventh embodiment of the present disclosure.

An automobile 1500 illustrated in FIG. 36 is an automobile to which a vehicle according to the present disclosure is applied. In FIG. 36, the automobile 1500 includes at least one system 1510 among an engine system, a brake system, and a keyless entry system. The physical quantity sensor 1 is built into the automobile 1500, and a posture of a car body 1501 can be detected by using the physical quantity sensor 1. A measurement signal in the physical quantity sensor 1 is supplied to a control device 1502. The control device 1502 may control the system 1510 based on the signal.

Such an automobile 1500 (vehicle) includes the physical quantity sensor 1, and the control device 1502 (control section (controller)) which performs control based on a measurement signal output from the physical quantity sensor 1. Thus, it is possible to achieve the effect of the physical quantity sensor 1 and thus to realize high reliability. The automobile 1500 includes at least one system 1510 among an engine system, a brake system, and a keyless entry system, and the control device 1502 controls the system 1510 based on a measurement signal. Consequently, it is possible to control the system 1510 with high accuracy.

The physical quantity sensor 1 is widely applicable to electronic control units (ECUs) such as a car navigation system, a car air conditioner, an antilock brake system (ABS), an air bag, a tire pressure monitoring system (TPMS), engine control, and a battery monitor of a hybrid car or an electric car.

A vehicle is not limited to the automobile 1500, and is applicable to, for example, an airplane, a rocket, an artificial satellite, a ship, an automated guided vehicle (AGV), a bipedal robot, and an unmanned aircraft such as a drone.

As mentioned above, although the physical quantity sensor, the physical quantity sensor device, the composite sensor device, the inertial measurement unit, the vehicle positioning apparatus, the portable electronic apparatus, the electronic apparatus, and the vehicle according to the embodiments have been described in detail, the present disclosure is not limited thereto, and a configuration of each part may be replaced with any configuration having the same function. Any other configuration may be added to the present disclosure. The above-described embodiments may be combined with each other as appropriate.

In the embodiments, a description has been made of a configuration in which the physical quantity sensor measures an acceleration, but a physical quantity measured by the physical quantity sensor is not particularly limited, and may be, for example, an angular velocity or pressure.

What is claimed is:

1. A physical quantity sensor comprising:
   three mutually orthogonal axes being defined as an X-axis, a Y-axis, and a Z-axis;
   a substrate that includes a first surface and a second surface that are orthogonal to the Z axis and are in a front-back relationship with each other, and a first fixed electrode and a second fixed electrode are provided on the first surface along the X axis;
   a movable body, the movable body being configured with:
      a first mass facing the first fixed electrode via a gap along the Z-axis;
      a second mass facing the second fixed electrode via a gap along the Z-axis; and
      a plurality of through-holes which penetrate through the movable body along the Z-axis,
   a fixed member arranged between the first mass and the second mass and fixed to the first surface of the substrate;
   a support beam that connects the movable body and the fixed member and is along the Y axis;
      wherein the movable body is movable in the Z-axis direction around the support beam as a rotation axis,
      when a damping that occurs in the movable body is C N·s/m, and
      a sensitivity when an inside-hole damping of the through-holes and a squeeze film damping between the movable body and the substrate are equal to each other is Cmin N·s/m,
      C≤1.5×Cmin is satisfied.

2. The physical quantity sensor according to claim 1, wherein $C \leq 1.4 \times C\min$.

3. The physical quantity sensor according to claim 2, wherein $C \leq 1.3 \times C\min$.

4. The physical quantity sensor according to claim 3, wherein $C \leq 1.2 \times C\min$.

5. The physical quantity sensor according to claim 1, wherein
an occupancy proportion of the plurality of through-holes in the movable body is 75% or more.

6. The physical quantity sensor according to claim 5, wherein
the occupancy proportion of the plurality of through-holes in the movable body is 78% or more.

7. The physical quantity sensor according to claim 6, wherein
the occupancy proportion of the plurality of through-holes in the movable body is 82% or more.

8. The physical quantity sensor according to claim 1, wherein
in a plan view along the Z-axis, an opening of each through-hole is a polygonal shape,
when the polygonal shape area is A1, and
a square area is A2,
then $0.75 \leq A1/A2 \leq 1.25$ is satisfied, and the opening of each through-hole is regarded as a square,
when a length of each of the through-holes along the Z-axis is indicated by H m,
a length of ½ of a length of the movable body along the Y axis is indicated by a m,
a length of the movable body along the X-axis is indicated by L m,
the gap between the first fixed electrode on the substrate and the movable body and the gap between the second fixed electrode on the substrate and the movable body are indicated by h m,
a length of one side of the square is S0,
a distance between adjacent through-holes is S1, and
a viscous resistance of a gas-filled inner space is indicated by μ kg/ms, $$C = 2aL \frac{8\mu H}{\beta^2 r_0^2}\left(1 + \frac{3r_0^4 K(\beta)}{16Hh^3}\right)\left[1 - \frac{l}{a}\tanh\left(\frac{a}{l}\right)\right] \quad (1)$$

is satisfied,
here, $$l = \sqrt{\frac{2h^3 H_{eff} \eta(\beta)}{3\beta^2 r_0^2}}$$

$$H_{eff} = H + \frac{3\pi r_0}{8}$$

$$\eta(\beta) = 1 + \frac{3r_0^4 K(\beta)}{16Hh^3}$$

$$K(\beta) = 4\beta^2 - \beta^4 - 4\ln\beta - 3$$

$$\beta = \frac{r_0}{r_c}$$

$$r_c = \frac{S0 + S1}{\sqrt{\pi}}$$

$$r_0 = 0.547 \times S0,$$

in the above Equation (1), $$\frac{3r_0^4 K(\beta)}{16Hh^3} = 1$$

is satisfied.

9. The physical quantity sensor according to claim 5, wherein $0.25 \leq S1/S0 \leq 3.00$.

10. The physical quantity sensor according to claim 9, wherein $0.6 \leq S1/S0 \leq 2.40$.

11. The physical quantity sensor according to claim 10, wherein $0.8 \leq S1/S0 \leq 2.00$.

12. The physical quantity sensor according to claim 1, wherein
in a plan view along the Z-axis, an opening each through-hole is a circular shape,
when a length of each of the through-holes along the Z-axis is indicated by H m,
a length of ½ of a length of the movable body along the Y axis is indicated by a m,
a length of the movable body along the X-axis is indicated by L m,
the gap between the first fixed electrode on the substrate and the movable body and the gap between the second fixed electrode on the substrate and the movable body are indicated by h m,
a radius of the through-hole is ro,
a length of ½ of a center-to-center distance between adjacent through-holes is rc, and
a viscous resistance of the gas-filled inner space is indicated by μ kg/ms, $$C = 2aL \frac{8\mu H}{\beta^2 r_0^2}\left(1 + \frac{3r_0^4 K(\beta)}{16Hh^3}\right)\left[1 - \frac{l}{a}\tanh\left(\frac{a}{l}\right)\right] \quad (1)$$

is satisfied,
here, $$l = \sqrt{\frac{2h^3 H_{eff} \eta(\beta)}{3\beta^2 r_0^2}}$$

$$H_{eff} = H + \frac{3\pi r_0}{8}$$

$$\eta(\beta) = 1 + \frac{3r_0^4 K(\beta)}{16Hh^3}$$

$$K(\beta) = 4\beta^2 - \beta^4 - 4\ln\beta - 3$$

$$\beta = \frac{r_0}{r_c}$$

is satisfied,
in the above Equation (1), $$\frac{3r_0^4 K(\beta)}{16 H h^3} = 1$$

is satisfied.

13. A physical quantity sensor device comprising:
the physical quantity sensor according to claim 1; and
a circuit element.

14. A composite sensor device comprising:
a first physical quantity sensor that is the physical quantity sensor according to claim 1; and
a second physical quantity sensor that measures a second physical quantity which is different from the first physical quantity measured by the first physical quantity sensor.

15. The composite sensor device according to claim 14, wherein
the first physical quantity sensor is configured to measure an acceleration as the first physical quantity, and
the second physical quantity sensor is configured to measure an angular velocity as the second physical quantity.

16. An inertial measurement unit comprising:
the physical quantity sensor according to claim 1; and
a control circuit that controls the drive of the physical quantity sensor.

17. An electronic apparatus comprising:
the physical quantity sensor according to claim 1; and
a controller configured to perform control based on a measurement signal output from the physical quantity sensor.

* * * * *